(12) United States Patent
Nagatoshi et al.

(10) Patent No.: US 11,856,337 B2
(45) Date of Patent: Dec. 26, 2023

(54) PROJECTION-TYPE DISPLAY DEVICE

(71) Applicant: FUJIFILM Corporation, Tokyo (JP)

(72) Inventors: Yukiko Nagatoshi, Saitama (JP); Akiko Nagahara, Saitama (JP); Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 177 days.

(21) Appl. No.: 17/591,788

(22) Filed: Feb. 3, 2022

(65) Prior Publication Data

US 2022/0264064 A1 Aug. 18, 2022

(30) Foreign Application Priority Data

Feb. 18, 2021 (JP) ................. 2021-024510

(51) Int. Cl.
*H04N 9/31* (2006.01)
*G02B 27/09* (2006.01)

(52) U.S. Cl.
CPC ....... *H04N 9/3152* (2013.01); *G02B 27/0955* (2013.01); *G02B 27/0988* (2013.01)

(58) Field of Classification Search
CPC .............. H04N 9/3152; G02B 27/0955; G02B 27/0988; G02B 27/0018; G03B 21/14
See application file for complete search history.

(56) References Cited

U.S. PATENT DOCUMENTS

| | | | | |
|---|---|---|---|---|
| 6,652,104 B2 * | 11/2003 | Nishida | ................ | H04N 9/3194 353/69 |
| 6,877,863 B2 * | 4/2005 | Wood | ................... | H04N 9/3185 353/42 |
| 7,070,283 B2 * | 7/2006 | Akutsu | ................ | H04N 9/3194 353/30 |
| 7,182,466 B2 * | 2/2007 | Sunaga | .................... | H04N 5/74 353/69 |
| 7,270,421 B2 * | 9/2007 | Shinozaki | ............ | G03B 21/142 353/121 |
| 7,359,575 B2 * | 4/2008 | Bassi | .................... | G06T 3/0093 345/427 |
| 7,441,906 B1 * | 10/2008 | Wang | ..................... | G03B 21/14 353/121 |
| 7,782,387 B2 * | 8/2010 | Azuma | ................ | H04N 23/635 359/662 |
| 2002/0051095 A1 * | 5/2002 | Su | ........................ | H04N 9/3194 348/745 |
| 2002/0122161 A1 * | 9/2002 | Nishida | ................ | H04N 9/3194 353/70 |

(Continued)

*Primary Examiner* — Michael B. Pierorazio
(74) *Attorney, Agent, or Firm* — Studebaker & Brackett PC

(57) ABSTRACT

A projection-type display device includes: a display element including a rectangular displayable region in which an image is displayable; and a projection optical system. Assuming that a focal length of the projection optical system is f and a length of a long side of the displayable region is w, 0.15<|f|/w<0.45 is satisfied. An absorption layer that absorbs light is provided in at least a portion of a non-optically effective surface of a lens which is disposed closer to a reduction side than a first lens closest to an enlargement side in the projection optical system and at least a part of a portion which is irradiated with light that has been emitted from an image and reflected by an enlargement-side surface of the first lens or a reduction-side surface of the first lens.

18 Claims, 16 Drawing Sheets

(56) References Cited

U.S. PATENT DOCUMENTS

| | | | |
|---|---|---|---|
| 2003/0191836 A1* | 10/2003 | Murtha | H04L 67/02 709/224 |
| 2003/0210381 A1* | 11/2003 | Itaki | H04N 5/74 353/70 |
| 2004/0156024 A1* | 8/2004 | Matsuda | H04N 9/3185 353/70 |
| 2005/0046803 A1* | 3/2005 | Akutsu | H04N 9/3194 353/69 |
| 2005/0073661 A1* | 4/2005 | Tamura | H04N 9/3194 353/70 |
| 2005/0151934 A1* | 7/2005 | Akutsu | G03B 21/147 353/69 |
| 2005/0237492 A1* | 10/2005 | Shinozaki | H04N 9/3185 353/69 |
| 2006/0098167 A1* | 5/2006 | Sato | G03B 21/26 353/35 |
| 2006/0187420 A1* | 8/2006 | Wei | G03B 21/16 353/61 |
| 2006/0203207 A1* | 9/2006 | Ikeda | H04N 9/3185 353/70 |
| 2007/0008344 A1* | 1/2007 | Medina | H04N 9/3185 345/647 |
| 2007/0257941 A1* | 11/2007 | Plut | G06F 9/451 345/660 |
| 2007/0285626 A1* | 12/2007 | Miyasaka | G03B 21/206 353/85 |
| 2009/0278999 A1* | 11/2009 | Ofune | H04N 21/47 348/E3.048 |
| 2010/0002123 A1* | 1/2010 | Nozaki | H04N 23/00 348/E5.022 |
| 2010/0045942 A1* | 2/2010 | Furui | H04N 9/3194 353/69 |
| 2011/0085044 A1* | 4/2011 | Noda | G03B 21/58 348/E5.133 |
| 2011/0210979 A1* | 9/2011 | Furui | H04N 9/3147 345/619 |
| 2011/0234994 A1* | 9/2011 | Uchiyama | H04N 9/3185 353/121 |
| 2011/0285971 A1* | 11/2011 | Oka | H04N 9/3185 353/70 |
| 2011/0292351 A1* | 12/2011 | Ishii | H04N 9/3185 353/69 |
| 2015/0241692 A1* | 8/2015 | Lin | G02B 13/16 353/31 |
| 2017/0299952 A1* | 10/2017 | Jorgensen | G03B 21/145 |
| 2018/0158102 A1* | 6/2018 | Choi | G06Q 30/0251 |
| 2021/0289178 A1* | 9/2021 | Ogishita | H04N 9/3194 |

\* cited by examiner

PROJECTION-TYPE DISPLAY DEVICE

CROSS-REFERENCE TO RELATED APPLICATIONS

The present application claims priority under 35 U.S.C. § 119 to Japanese Patent Application No. 2021-024510, filed on Feb. 18, 2021. The above application is hereby expressly incorporated by reference, in its entirety, into the present application.

BACKGROUND

Technical Field

The technology of the present disclosure relates to a projection-type display device.

Related Art

In the related art, a projection-type display device is known which projects an image displayed by a display element onto a screen through a projection optical system. For example, US2015/0241692A described below discloses a projection-type display device that includes a projection lens assembly as a projection optical system.

In recent years, there has been an increasing demand for a projection-type display device that has high portability and installability and can project a projection image onto a large screen at a short projection distance. A slow ratio is used as one of the indexes for projecting a projection image onto a large screen at a short projection distance. The slow ratio is expressed as the ratio of a projection distance to the length of a projection image on the screen in the longitudinal direction, which will be described in detail below. In order to meet the above demands, it is required to develop a projection-type display device which is small and lightweight and has a low slow ratio.

On the other hand, there is a strong demand for a projection-type display device that can project a good projection image with high contrast. In the projection-type display device, some of luminous fluxes emitted from a display element are reflected by an optical element in a projection optical system and become stray light, which may cause a reduction in the contrast of a projection image. Therefore, in some cases, as the slow ratio of the projection-type display device becomes lower, the reduction in the contrast of the projection image due to the stray light becomes more remarkable. From this circumstance, it is preferable to pay attention to stray light in the projection-type display device having a low slow ratio.

US2015/0241692A discloses an example of the projection lens assembly in which a plano-concave lens having a flat enlargement-side surface is disposed in a first lens group that is disposed adjacent to a screen (see FIG. 3 in US2015/0241692A). Further, US2015/0241692A discloses an example of the projection lens assembly in which a meniscus lens, that has a negative refractive power and has an enlargement-side surface and a reduction-side surface whose radius of curvature is about 100 to 200 millimeters (mm), is disposed in the first lens group disposed adjacent to the screen (see FIG. 4 in US2015/0241692A). However, the configuration illustrated in FIG. 3 in US2015/0241692A has room for improvement in terms of a small size, light weight, and a low slow ratio. Further, the configuration illustrated in FIG. 4 in US2015/0241692A has room for improvement in terms of suppressing a reduction in contrast caused by stray light.

SUMMARY

The present disclosure has been made in view of the above circumstances, and an object of the present invention is to provide a projection-type display device that is small and lightweight, has a low slow ratio, suppresses a reduction in contrast due to stray light, and can project a good image.

According to a first aspect of the technology of the present, there is provided a projection-type display device comprising: a display element including a rectangular displayable region in which an image is displayable; and a projection optical system that includes a plurality of lenses and projects the image displayed by the display element to form a projection image. Assuming that an effective radius of an enlargement-side surface of a first lens which is closest to an enlargement side among the plurality of lenses included in the projection optical system is h1$f$; in a cross section that is parallel to an optical axis and includes the optical axis, a distance from an intersection between the optical axis and a normal line to the enlargement-side surface of the first lens at a point at a height h from the optical axis on the enlargement-side surface to the point at the height h is a local radius of curvature at the height h and is represented by Rc(h); and a sign of the local radius of curvature is positive in a case in which the intersection is closer to a reduction side than the point at the height h and is negative in a case in which the intersection is closer to an enlargement side than the point at the height h, Rc(h1$f$)>0 and Rc(h1$f$/2)>0 are satisfied. Assuming that a focal length of the projection optical system is f and a length of a long side of the displayable region is w, the following Conditional Expressions (1) and (2) are satisfied:

$$0.15<|f|/w<0.45 \qquad (1); \text{and}$$

$$0<Rc(h1f)/Rc(h1f/2)<0.8 \qquad (2).$$

An absorption layer that absorbs light is provided in at least a portion of a non-optically effective surface of a lens which is disposed closer to the reduction side than the first lens and at least a part of a portion which is irradiated with light that has been emitted from the image and reflected by the enlargement-side surface of the first lens or a reduction-side surface of the first lens.

Preferably, the projection-type display device according to the above-mentioned aspect satisfies at least one of the following Conditional Expression (1-1) or Conditional Expression (2-1):

$$0.2<|f|/w<0.4 \qquad (1\text{-}1); \text{and}$$

$$0.2<Rc(h1f)/Rc(h1f/2)<0.7 \qquad (2\text{-}1).$$

According to a second aspect of the technology of the present disclosure, in the projection-type display device according to the first aspect, preferably, the absorption layer is provided on the non-optically effective surface of a second lens that is second from the enlargement side among the plurality of lenses included in the projection optical system.

In the projection-type display device according to the second aspect, preferably, assuming that a distance from the enlargement-side surface of the first lens to an enlargement-side surface of the second lens on the optical axis is Db12, a distance from the enlargement-side surface of the first lens to a paraxial entrance pupil position of the projection optical system on the optical axis in a case in which the enlargement side is an incident side is Denp, a sign of Db12 is positive, and a sign of Denp is positive in a case in which the paraxial entrance pupil position is closer to the reduction side than the enlargement-side surface of the first lens and is negative in a case in which the paraxial entrance pupil position is closer to the enlargement side than the enlargement-side surface of the first lens on the optical axis, the following Conditional Expression (3) is satisfied:

$$0.2 < Db12/Denp < 1 \qquad (3).$$

In the projection-type display device according to the second aspect, preferably, assuming that the effective radius of the enlargement-side surface of the second lens is h2f, the effective radius of the reduction-side surface of the first lens is h1r, a reduction-side maximum image height of the projection optical system is Ymax, and Y1=Ymax×h2f/h1r is established, the absorption layer is provided in at least a portion of the non-optically effective surface of the second lens and at least a part of a portion which is irradiated with light that has been emitted from a position at a height Y1 from the optical axis on the image and reflected by the enlargement-side surface of the first lens or the reduction-side surface of the first lens.

In the projection-type display device according to the second aspect, preferably, the second lens is a meniscus lens that has a convex surface facing the enlargement side and has a negative refractive power. In this case, assuming that a paraxial radius of curvature of the enlargement-side surface of the second lens is R2f and a paraxial radius of curvature of a reduction-side surface of the second lens is R2r, it is preferable that the following Conditional Expression (4) is satisfied:

$$1.2 < R2f/R2r < 10 \qquad (4), \text{ and}$$

it is more preferable that the following Conditional Expression (4-1) is satisfied:

$$1.5 < R2f/R2r < 5 \qquad (4-1).$$

In the above-described aspect, preferably, the enlargement-side surface of the first lens has a shape in which an inflection point is within the effective radius in a cross section that is parallel to the optical axis and includes the optical axis.

In the above-described aspect, the enlargement-side surface of the first lens may be configured to have a concave shape in a paraxial region.

In the above-described aspect, preferably, a material forming the first lens has a specific gravity of 1.5 or less.

In the projection-type display device according to the above-described aspect, preferably, light for projecting the projection image has a brightness of 5000 ANSI lumens or more.

According to the technology of the present disclosure, it is possible to provide a projection-type display device which is small and lightweight, has a low slow ratio, suppresses a reduction in contrast due to stray light, and can project a good image.

DESCRIPTION OF EMBODIMENTS

Hereinafter, an example of an embodiment according to the technology of the present disclosure will be described in detail with reference to the drawings.

Figure 1:
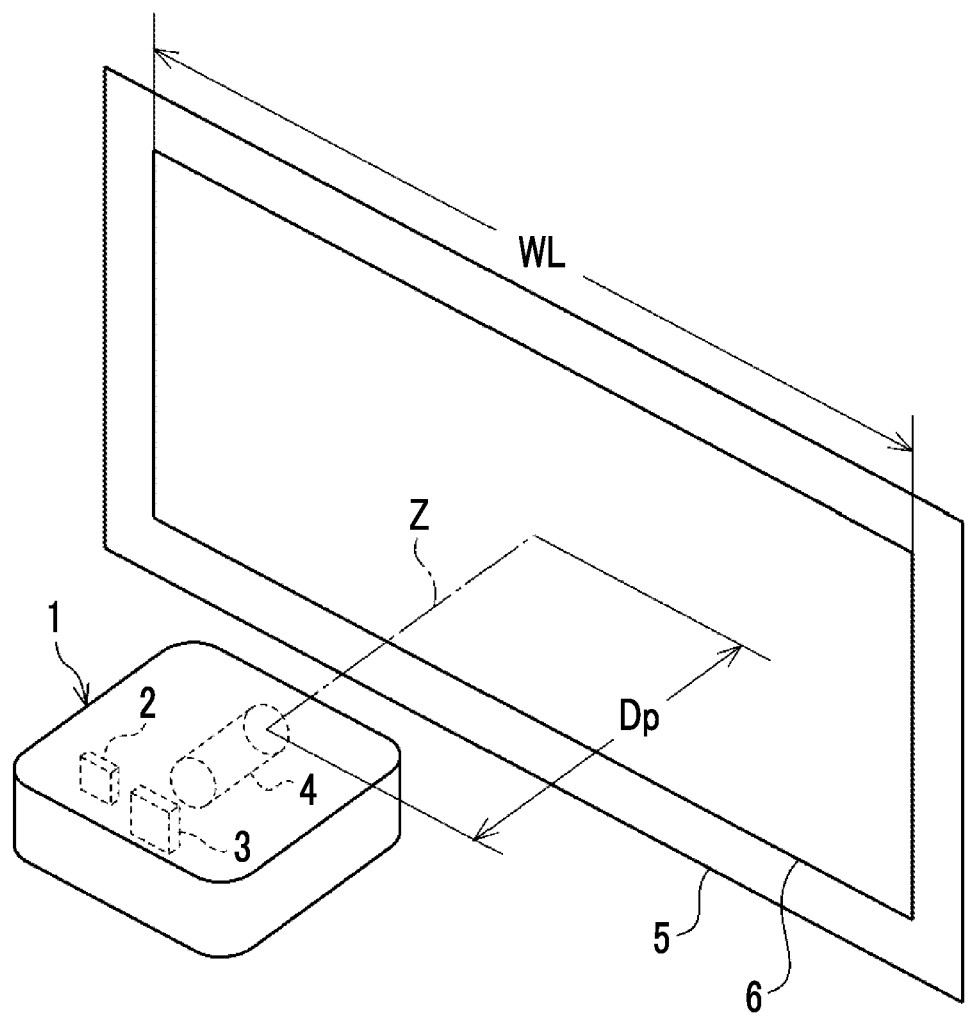
FIG. 1 is a diagram schematically illustrating an example of a usage state of a projection-type display device.

FIG. 1 illustrates an example of the usage state of a projection-type display device 1 according to an embodiment of the technology of the present disclosure. FIG. 1 conceptually illustrates a light source unit 2, a display element 3, and a projection optical system 4 included in a projection-type display device 1. The display element 3 displays images. The projection optical system 4 projects an enlarged image of the image displayed by the display element 3 as a projection image 6 on a screen 5.

In the projection-type display device 1, in a case in which a projection distance is Dp and the length of the projection image 6 projected onto the screen 5 in a longitudinal direction is WL, a slow ratio T is represented by T=Dp/WL. The projection distance is a distance from a surface which is closest to the screen in the projection optical system 4 to the screen 5. In a case in which a lens is disposed at a position that is closest to the screen in the projection optical system 4, a distance from a screen-side lens surface of the lens to the screen 5 on an optical axis is the projection distance. However, it is assumed that a distance within the range in which the optical performance is guaranteed in the projection-type display device 1, that is, a distance within the range in which the projection image 6 in focus is obtained is used as the projection distance used to calculate T. Further, it is assumed that the projection image 6 used to calculate T is an image which is projected onto the screen 5 perpendicular to an optical axis Z of the projection optical system 4.

The screen 5 means an object onto which the projection image 6 is projected. The screen 5 may be, for example, a dedicated screen or a wall surface, a floor surface, or a ceiling of a room. Further, in a case in which the projection-type display device 1 is used outdoors, for example, an outer wall of a building is also included in the screen 5.

For example, the light source unit 2 can be configured as follows. The light source unit 2 includes a white light source, a rotating color filter, and an illumination optical system. The white light source emits white light. For example, a laser light source can be used as the white light source. In the rotating color filter, three color filters of blue, green, and red are provided on the circumference. In a case in which the rotating color filter is rotated, the filter of each color is selectively inserted into an optical path of the white light emitted by the white light source. Then, the white light is selectively converted into blue light, green light, and red light in a time-division manner. The illumination optical system performs an operation of improving the uniformity of the light amount distribution of the light emitted from the rotating color filter in a cross section perpendicular to the optical axis Z and guides the light to the display element 3.

For example, a digital micromirror device (DMD: registered trademark) can be used as the display element 3. The DMD has a plurality of movable micromirrors that are two-dimensionally arranged. Each micromirror corresponds to a pixel of the display element 3 and can change the reflection direction of the light emitted from the light source unit 2. The DMD changes the direction of each micromirror according to the image to switch the turn-on and turn-off of the reflected light of the light from the light source unit 2, thereby performing optical modulation according to the image.

Figure 2:
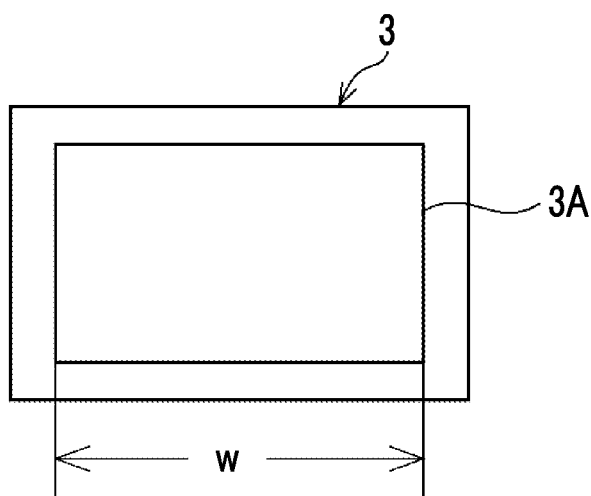
FIG. 2 is a diagram illustrating a schematic configuration of a display element.

FIG. 2 illustrates the schematic configuration of the display element 3 in a plane perpendicular to the optical axis Z of the projection optical system 4. The display element 3 has a rectangular displayable region 3A in which an image can be displayed. In addition, the term "rectangular" includes not only the meaning of a perfect rectangular shape but also the meaning of a rectangular shape including an error that is allowable in practice. The displayable region 3A is not necessarily matched with an image display region in which an image is actually displayed. The displayable region 3A is a region in which pixels for displaying an image are arranged. Therefore, in a case in which the projection-type display device 1 is used, an image may be displayed in the entire displayable region 3A, or an image may be displayed only in a portion of the displayable region 3A.

In a case in which the length of a long side of the displayable region 3A of the display element 3 is w and the focal length of the projection optical system 4 is f, the projection-type display device 1 is configured to satisfy the following Conditional Expression (1).

In a case in which the projection optical system 4 is a variable magnification optical system, f is a focal length at a wide-angle end. In a case in which the projection-type display device 1 is configured such that a value of |f|/w is not equal to or less than the lower limit of Conditional Expression (1), distortion in the entire screen is reduced, and it is easy to project a high-resolution image. In a case in which the projection-type display device 1 is configured such that the value of |f|/w is not equal to or greater than the upper limit of Conditional Expression (1), it is easy to achieve a low slow ratio. In order to obtain better characteristics, it is more preferable that the projection-type display device 1 satisfies the following Conditional Expression (1-1).

$$0.15 < |f|/w < 0.45 \quad (1)$$

$$0.2 < |f|/w < 0.4 \quad (1\text{-}1)$$

Figure 3:
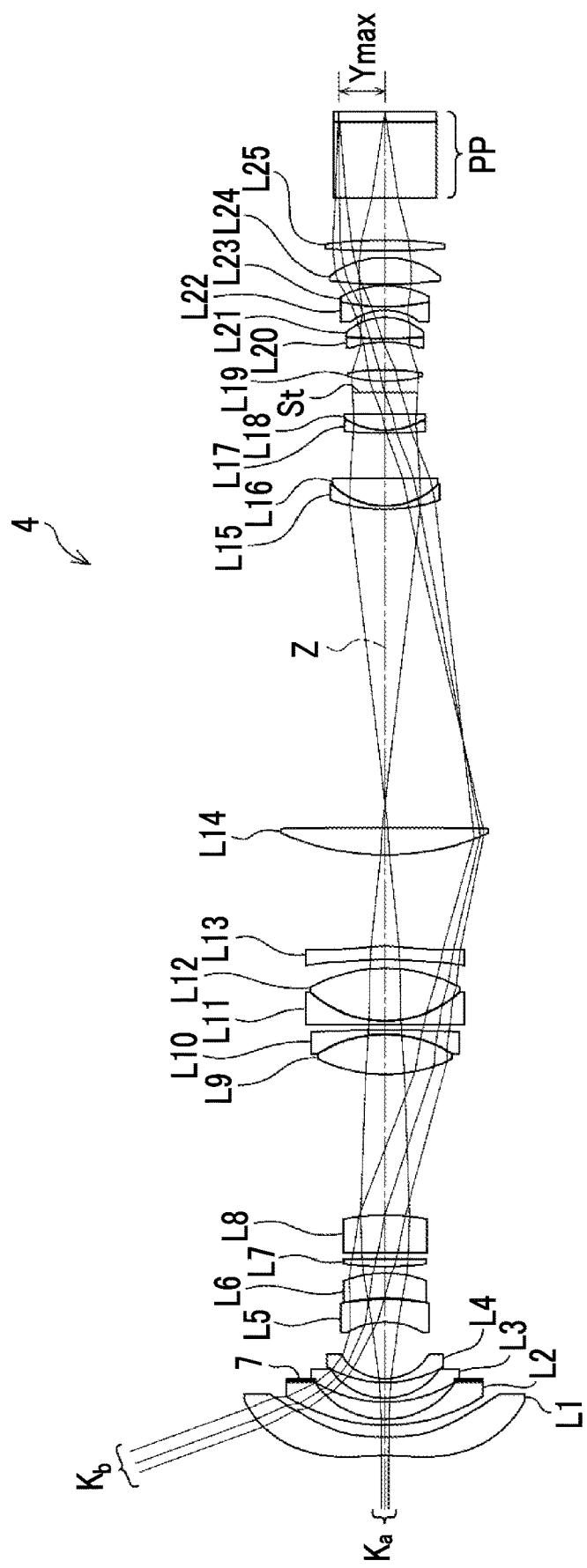
FIG. 3 is a cross-sectional view illustrating a configuration of a projection optical system and luminous flux according to an example of an embodiment of the present disclosure which corresponds to a projection optical system according to Example 1.

The projection optical system 4 is configured to include a plurality of lenses. For example, FIG. 3 illustrates the configuration of the projection optical system 4 in the cross section that is parallel to the optical axis Z and includes the optical axis Z. The configuration example illustrated in FIG. 1 corresponds to Example 1 which will be described below. In the following description, in some cases, a screen side and a display element side on the optical path of the projection optical system 4 are referred to as an enlargement side and a reduction side, respectively. In FIG. 3, the left side is the enlargement side, and the right side is the reduction side.

The projection optical system 4 illustrated in FIG. 3 comprises a first lens L1, a second lens L2, a third lens L3, and a fourth lens L4 which are continuously arranged in order from the enlargement side to the reduction side along the optical axis Z. In the example illustrated in FIG. 3, a peripheral portion of an enlargement-side surface of the first lens L1 has a shape in which a convex surface faces the enlargement side. In the example illustrated in FIG. 3, all of the second lens L2, the third lens L3, and the fourth lens L4 are meniscus lenses which have convex surfaces facing the enlargement side and have a negative refractive power. Hereinafter, the meniscus lens having a negative refractive power is also simply referred to as a negative meniscus lens. Further, the surface shape and the sign of the refractive power of the lens described in this specification without particular notice indicate the surface shape and the sign of the refractive power in a paraxial region, respectively. An absorption layer 7 that absorbs light is provided in a portion of a reduction-side surface of the second lens L2. The absorption layer 7 will be described in detail below.

The projection optical system 4 illustrated in FIG. 3 comprises lenses L5 to L18, an aperture stop St, lenses L19 to L25, and an optical member PP which are provided closer to the reduction side than the fourth lens L4 and are arranged in order from the enlargement side to the reduction side along the optical axis Z. In FIG. 3, the size and shape of the aperture stop St are not illustrated, but the position thereof in the direction of the optical axis is illustrated. The optical member PP is a member that does not have a refractive power. For example, a filter, a cover glass, and a prism are assumed as the optical member PP. In the example illustrated in FIG. 3, the position of a reduction-side surface of the optical member PP is aligned with the position of an image display surface of the display element 3 in the direction of the optical axis.

The projection optical system 4 enlarges the image displayed by the display element 3 and projects the image onto the screen 5 to form the projection image 6. The image displayed on the image display surface of the display element 3 and the projection image 6 on the screen have an optically conjugate relationship. According to this conjugate relationship, in the projection optical system 4, the image display surface corresponds to a reduction-side image plane, and the screen 5 corresponds to an enlargement-side image plane.

In addition, FIG. 3 illustrates an effective luminous flux that is emitted from the display element 3, is transmitted through the projection optical system 4, and is used to form the projection image 6. A luminous flux that is emitted from any point of the image of the display element 3 and used to form the projection image 6 is the effective luminous flux. In practice, there are an enormous number of effective luminous fluxes. However, FIG. 3 typically illustrates an on-axis luminous flux Ka and a luminous flux Kb with the maximum image height.

Figure 4:
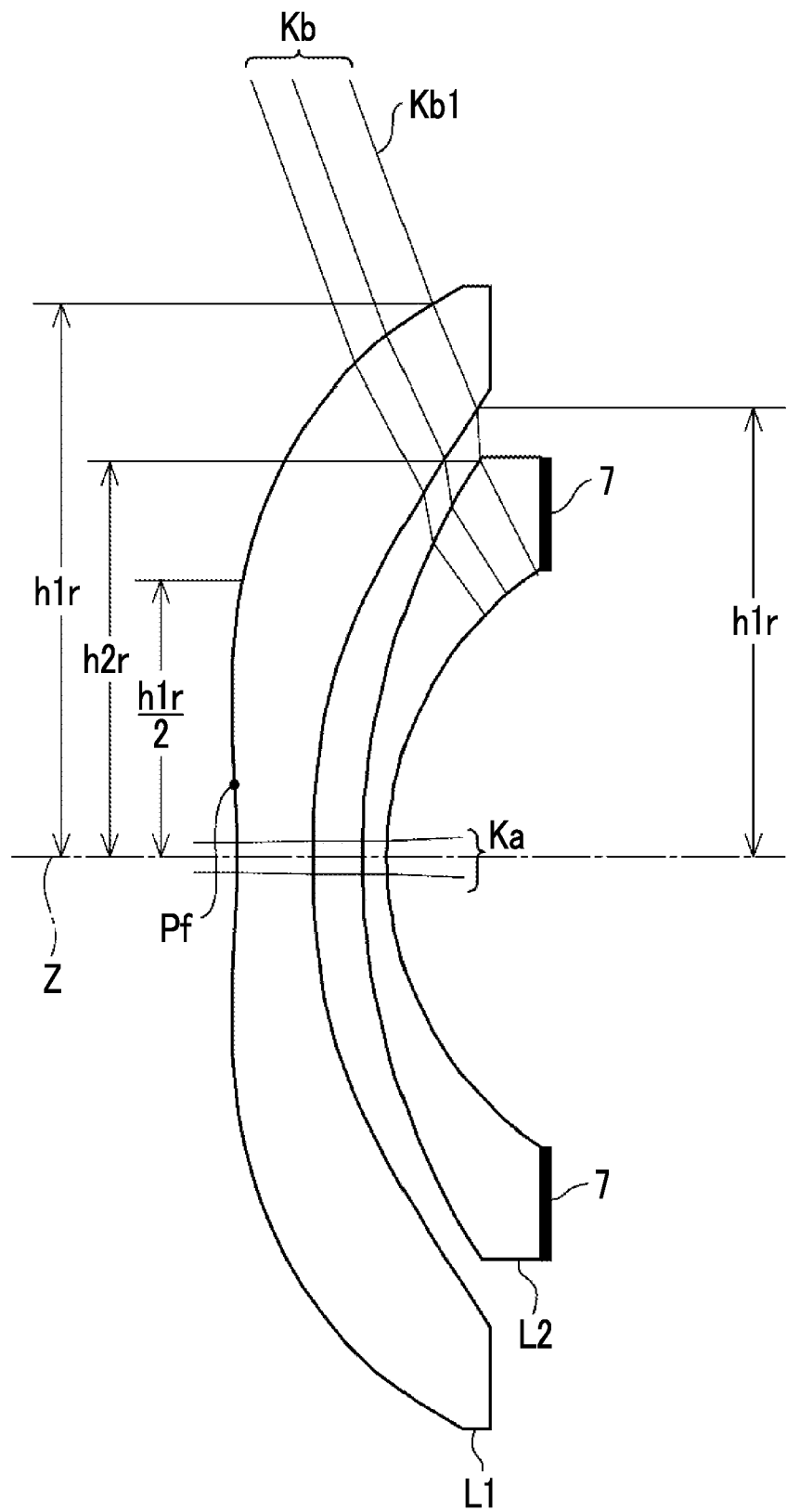
FIG. 4 is a partially enlarged view illustrating effective radii.

FIG. 4 is an enlarged view illustrating the first lens L1 and the second lens L2 illustrated in FIG. 3 and the on-axis luminous flux Ka and the luminous flux Kb with the maximum image height which pass through the two lenses. FIG. 4 illustrates an effective radius h1$f$ of the enlargement-side surface of the first lens L1, h1$f$/2 which is a radius that is half of the effective radius h1$f$, an effective radius h1$r$ of a reduction-side surface of the first lens L1, and an effective radius h2$f$ of an enlargement-side surface of the second lens L2.

In the specification, the effective radius of a surface of a lens in the projection optical system 4 means a distance from an intersection between a ray passing through the outermost side among rays for imaging, which pass through the surface, and the surface to the optical axis Z. Here, the term "rays for imaging" are rays for forming the projection image 6. In addition, the "outside" is the outside of the optical axis Z in a radial direction, that is, a side away from the optical axis Z. In a case in which the projection optical system 4 is a variable magnification optical system, the "ray passing through the outermost side" is determined considering the entire variable magnification region. In the first lens L1 and the second lens L2 illustrated in FIG. 4, the ray passing through the outermost side among the rays for imaging is an upper ray Kb1 of the luminous flux Kb with the maximum image height.

The projection optical system 4 is configured to have a wide angle of view in order to achieve a low slow ratio. In an optical system having a wide angle of view, the diameter of a lens that is closest to the enlargement side is likely to be large. However, it is desirable to suppress an increase in the diameter of the lens as much as possible in order to reduce the size of the optical system. Therefore, in the technology of the present disclosure, the local radius of curvature described below is defined, and the projection optical system 4 is configured to satisfy a predetermined conditional expression for the local radius of curvature at a point where the height of the enlargement-side surface of the first lens L1 from the optical axis Z is h1$f$ and a point where the height is h1$f$/2.

Figure 5:
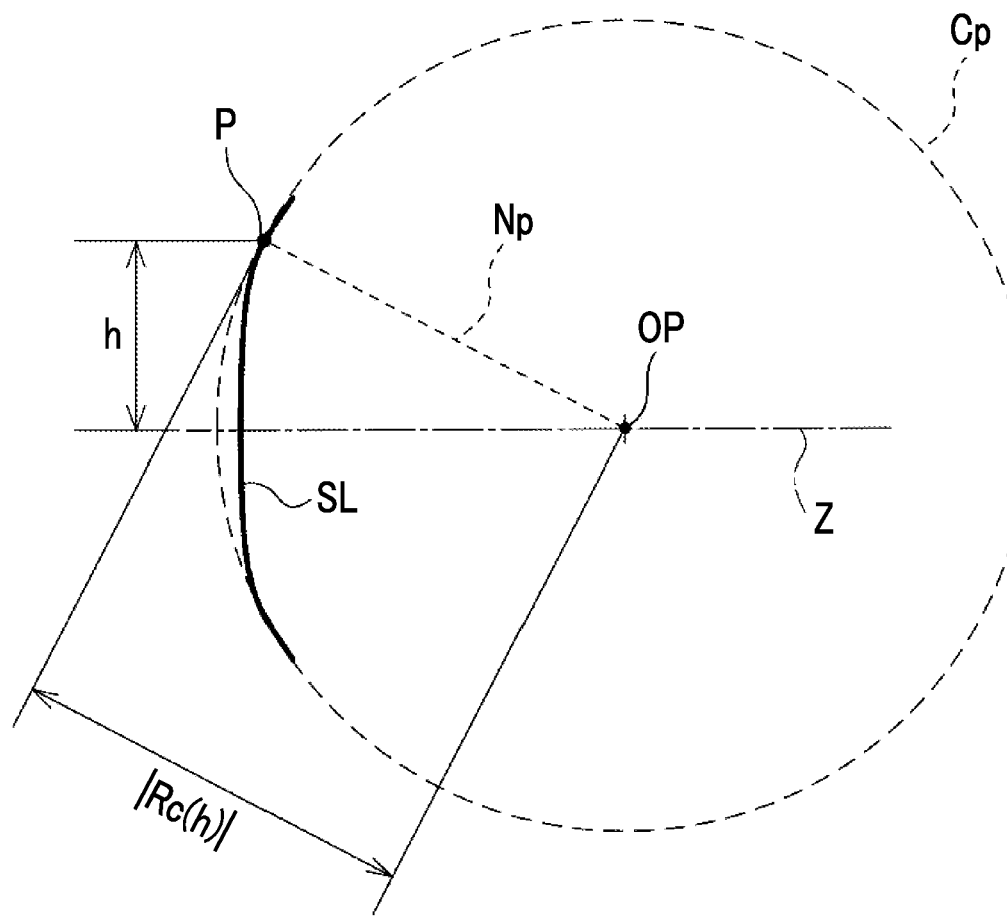
FIG. 5 is a diagram illustrating a local radius of curvature.

The definition of the local radius of curvature will be described with reference to FIG. 5. FIG. 5 is a diagram of a cross section that is parallel to the optical axis Z and includes the optical axis Z. In FIG. 5, a portion of a surface SL of a certain lens is represented by a thick line. It is assumed that a line which is perpendicular to the surface SL at a point P at a height h from the optical axis Z on the surface SL is a normal line Np. The normal line Np is a line that is perpendicular to a tangent plane of the lens surface SL at the point P and passes through the point P. A distance from an intersection OP between the normal line Np and the optical axis Z to the point P is defined as the local radius of curvature of the surface SL at the height h and is represented by Rc(h). In FIG. 5, the length of a line segment connecting the intersection OP and the point P is represented by the absolute value |Rbp| of the local radius of curvature Rc(h). Further, FIG. 5 illustrates a circle Cp that has a radius of |Rc(h)|, has the intersection OP as the center, and passes through the point P for ease of understanding. The example illustrated in FIG. 5 is illustrative, and the local radius of curvature can be calculated at any point of a surface of a lens having any shape.

The sign of the local radius of curvature is positive in a case in which the intersection OP is closer to the reduction side than the point P and is negative in a case in which the intersection OP is closer to the enlargement side than the point P. In FIG. 5, the left side is the enlargement side, and the right side is the reduction side. In the example illustrated in FIG. 5, the sign of the local radius of curvature at the point P is positive.

It is assumed that the local radius of curvature of the enlargement-side surface of the first lens L1 at the height h1$f$ from the optical axis Z is Rc(h1$f$) and the local radius of curvature of the enlargement-side surface of the first lens L1 at the height h1$f$/2 from the optical axis Z is Rc(h1$f$/2). The projection optical system 4 is configured such that Rc(h1$f$)>0 and Rc(h1$f$/2)>0 are satisfied. According to this configuration, in the enlargement-side surface of the first lens L1, it is easy to form a portion, which is on the outer side of the position corresponding to half of the effective radius in the radial direction, in a shape in which a convex surface faces the enlargement side. That is, it is easy to form a peripheral portion of the enlargement-side surface of the first lens L1 in a shape in which a convex surface faces the enlargement side. This shape makes it possible to reduce the diameter of the lens, which is advantageous for miniaturization and weight reduction.

In addition, the projection optical system 4 is configured to satisfy the following Conditional Expression (2) for Rc(h1$f$) and Rc(h1$f$/2).

In a case in which the projection optical system 4 is configured such that a value of Rc(h1$f$)/Rc(h1$f$/2) is not equal to or less than the lower limit of Conditional Expression (2), the amount of change in the positive refractive power in a case in which the height from the optical axis Z changes from h1$f$/2 to h1$f$ is not too large in the enlargement-side surface of the first lens L1. Therefore, it is possible to suppress influence on the quality of the projection image 6 due to the assembly error of the lens. In a case in which the projection optical system 4 is configured such that the value of Rc(h1$f$)/Rc(h1$f$/2) is not equal to or greater than the upper limit of Conditional Expression (2), the projection-type display device 1 with a low slow ratio has small distortion and is advantageous in forming the projection image 6 with a high resolution. Further, in a case in which the projection optical system 4 is configured such that the value of Rc(h1$f$)/Rc(h1$f$/2) is not equal to or greater than the upper limit of Conditional Expression (2), it is easy to form the enlargement-side surface of the first lens L1 in a shape in which the local radius of curvature becomes smaller as the height from the optical axis Z becomes larger. This shape makes it easy to transmit a ray with the maximum image height without increasing the diameter of the lens even in an optical system having a wide angle of view, which is advantageous for miniaturization and weight reduction. In order to obtain better characteristics, it is more preferable that the projection optical system 4 satisfies the following Conditional Expression (2-1).

$$0 < Rc(h1f)/Rc(h1f/2) < 0.8 \qquad (2)$$

$$0.2 < Rc(h1f)/Rc(h1f/2) < 0.7 \qquad (2\text{-}1)$$

As illustrated in FIG. 4, in this example, a peripheral portion of the enlargement-side surface of the first lens L1 has a convex shape. In a case in which the enlargement-side surface of the first lens L1 has this shape, it is preferable that a peripheral portion of the reduction-side surface of the first lens L1 has a concave shape as illustrated in FIG. 4 in order to reduce the size and weight while ensuring a wide angle of view. However, in a case in which the peripheral portions of the enlargement-side and reduction-side surfaces of the first lens L1 have the above shape, light which has been emitted from the image of the display element 3 and reflected by the first lens L1 becomes stray light, and the stray light reaches the lens which is closer to the reduction side than the first lens L1, which may cause a reduction in the contrast of the projection image 6.

Figure 6:
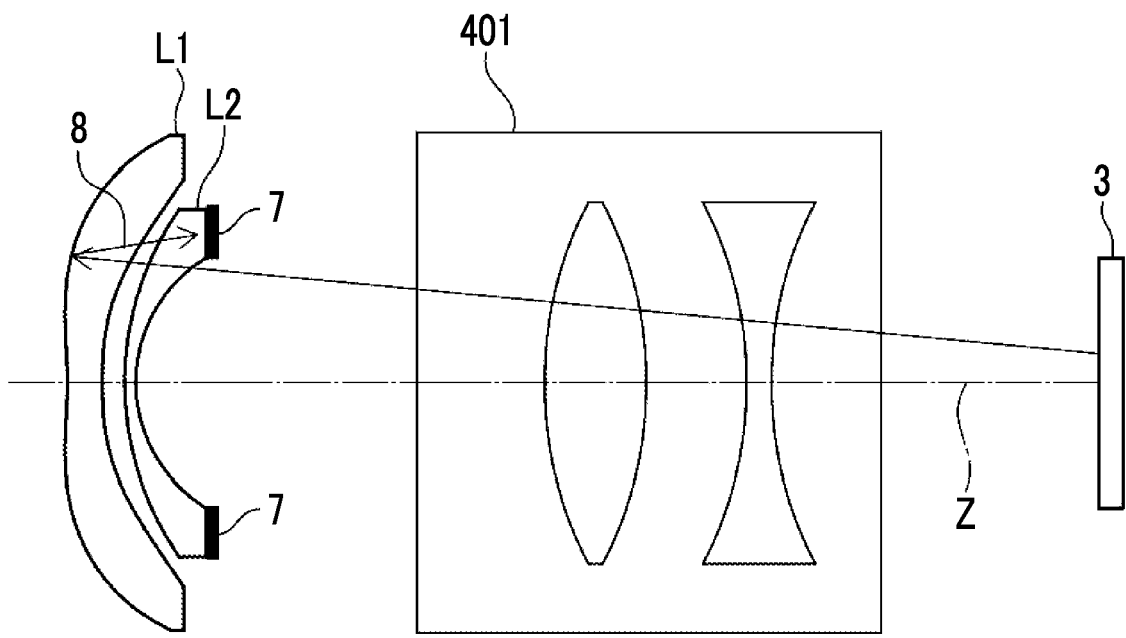
FIG. 6 is a diagram schematically illustrating an aspect in which reflected light reaches a second lens.

FIG. 6 schematically illustrates an aspect in which light 8 that has been emitted from the image of the display element 3 and reflected by the enlargement-side surface of the first lens L1 reaches the second lens L2. FIG. 6 is a schematic diagram. In FIG. 6, the refraction action of the light 8 in each lens surface is ignored, and the optical path of the light 8 is simply illustrated. In addition, in FIG. 6, the overall configuration of an optical element 401 which is closer to the reduction side than the second lens L2 in the projection optical system 4 is schematically illustrated.

For example, the light 8 illustrated in FIG. 6 reaches a reduction-side flat surface of the peripheral portion of the second lens L2. The flat surface of the second lens L2 is a surface that is located outside the effective radius and is perpendicular to the optical axis Z, and has a shape different from that of a surface within the effective radius. The flat surface of the second lens L2 is classified as a non-optically effective surface in the technology of the present disclosure. The non-optically effective surface will be described in detail below. However, in the technology of the present disclosure, the non-optically effective surface is a surface that does not transmit the rays for imaging among the lens surfaces. In the lens surface, a portion within the effective radius which transmits the rays for imaging is mirror-finished by, for example, polishing. However, the non-optically effective surface is not necessarily mirror-finished and is usually a rough surface at a micro level, as compared to the portion within the effective radius. In a case in which the light 8 reflected by the first lens L1 reaches the non-optically effective surface, the light 8 becomes a secondary light source and is scattered at a large angle. Then, in a case in which the scattered light reaches the screen 5, the contrast of the projection image 6 is reduced. The rate at which the scattered light reaches the screen 5 becomes higher as the slow ratio becomes lower.

Therefore, in the projection optical system 4, the absorption layer 7 that absorbs the light 8 is provided in at least a portion of the non-optically effective surface of the lens which is disposed closer to the reduction side than the first lens L1 and at least a part of a portion which is irradiated with the light 8 that has been emitted from the image and reflected by the enlargement-side surface of the first lens L1 or the reduction-side surface of the first lens L1. In addition, the "light emitted from the image" means light emitted from the image display region of the display element 3. According to the above configuration, even in a case in which the light 8 reflected by the first lens L1 reaches the non-optically effective surface of the reduction-side lens after the second lens L2, the absorption layer 7 can absorb the light 8. As a result, it is possible to reduce the scattered light that reaches the screen 5 and thus to suppress a reduction in contrast due to stray light.

For example, a black paint can be used for the absorption layer 7. For example, the absorption layer 7 may be made of a resin including a black pigment and/or a black dye. For example, an epoxy resin can be used as the resin. Alternatively, the absorption layer 7 may be a deposition film. The deposition film may be made of, for example, at least one of titanium, titanium oxide, or chromium. Preferably, the average value of the absorbance of the absorption layer 7 in the wavelength range of 400 to 700 nm is equal to or greater than 50%.

For example, in this example, the absorption layer 7 is provided on the non-optically effective surface of the second lens L2 which is second from the enlargement side. The provision of the absorption layer 7 on the second lens L2 which is a lens closest to the first lens L1 makes it easy to effectively suppress a reduction in contrast due to stray light. In addition, in FIG. 3, FIG. 4, and FIG. 6, for ease of understanding, the absorption layer 7 is exaggeratingly illustrated, and the thickness of the absorption layer 7 is different from the actual thickness. This illustration method related to the thickness of the absorption layer 7 holds for other drawings.

An optically effective surface and a non-optically effective surface in the technology of the present disclosure will be described with reference to FIG. 7. The non-optically effective surface is a surface that is different from the optically effective surface among the lens surfaces.

Figure 7:
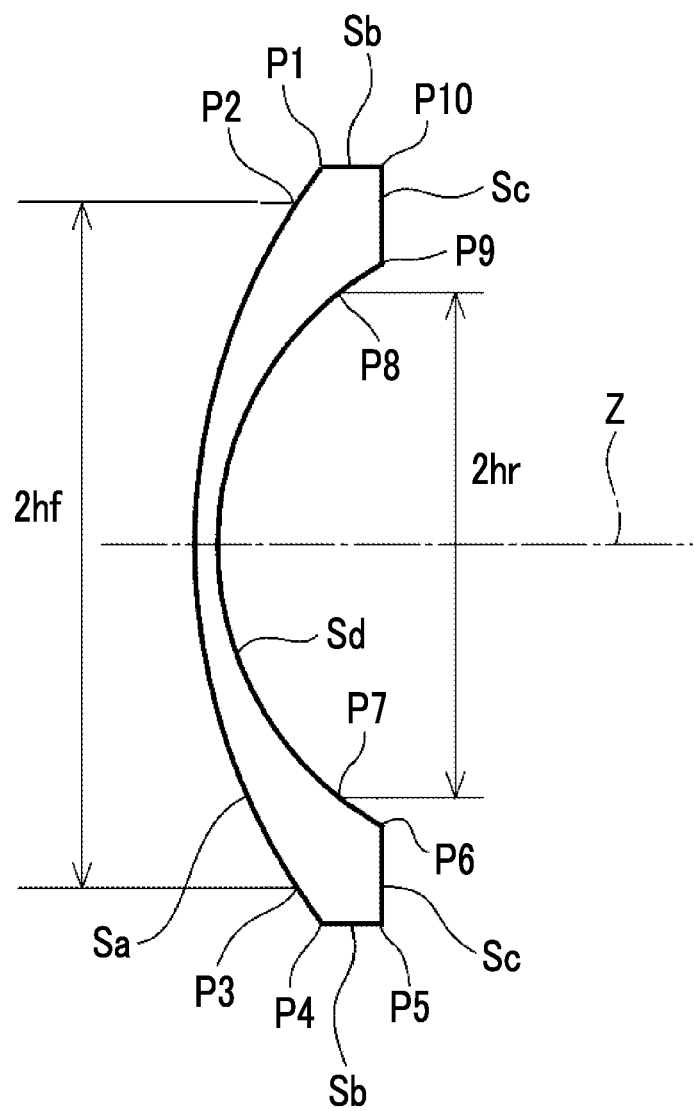
FIG. 7 is a diagram illustrating an optically effective surface and a non-optically effective surface.

FIG. 7 is a diagram illustrating a non-optically effective surface and is a cross-sectional view of a lens in a cross section that is parallel to the optical axis Z and includes the optical axis Z. In FIG. 7, the left side is the enlargement side, and the right side is the reduction side. In FIG. 7, ten points from a point P1 to a point P10 are given as points on the cross section of the lens for explanation. The effective radius of an enlargement-side surface of the lens illustrated in FIG. 7 is hf, and the effective radius of a reduction-side surface is hr. The lens illustrated in FIG. 7 is configured to be rotationally symmetric with respect to the optical axis Z as the axis of symmetry.

In the lens surface, a region from the point P2 to the point P3 in FIG. 7 is within the effective radius and transmits the rays for imaging. In the lens surface, a region from the point P1 to the point P2 has a shape that is formed on the basis of the same design data as the region within the effective radius. The same design data means the same radius of curvature in a case in which the shape within the effective radius is a spherical shape and means the same aspheric equation and the same aspherical coefficient in a case in which the shape within the effective radius is an aspherical shape. In other words, the region from the point P1 to the point P2 has a shape obtained by extending the surface shape at the point P2 outward in the radial direction. Since the lens illustrated in FIG. 7 is configured to be rotationally symmetric with respect to the optical axis Z, a region from the point P4 to the point P3 is the same as the region from the point P1 to the point P2. A region from the point P1 to the point P4 is formed as a continuous surface on the basis of the same design data. In the technology of the present disclosure, a surface Sa that consists of the region from the point P1 to the point P4 is the optically effective surface.

This holds for the reduction-side surface of the lens illustrated in FIG. 7. In the lens surface, a region from the point P7 to the point P8 is within the effective radius and transmits the rays for imaging. A region from the point P8 to the point P9 has a shape that is formed on the basis of the same design data as the shape within the effective radius. That is, the region from the point P8 to the point P9 has a shape obtained by extending the surface shape at the point P8 outward in the radial direction. Since the lens illustrated in FIG. 7 is configured to be rotationally symmetric with respect to the optical axis Z, a region from the point P7 to the point P6 is the same as the region from the point P8 to the point P9. A region from the point P6 to the point P9 is formed as a continuous surface on the basis of the same design data. A surface Sd that consists of the region from the point P6 to the point P9 is the optically effective surface.

In the lens illustrated in FIG. 7, a surface excluding the enlargement-side surface Sa and the reduction-side surface Sd is the non-optically effective surface. That is, all of a surface Sb and a surface Sc are the non-optically effective surfaces. The surface Sb is a flat surface that is located in the outer circumference in the radial direction and is parallel to the optical axis Z. In the specification, this non-optically effective surface is referred to as an edge surface. The surface Sb which is the edge surface is formed in the entire circumference of the lens. However, since FIG. 7 is a cross-sectional view of the lens, the surface Sb is illustrated with a reference between the point P4 and the point P5 and between the point P1 and the point P10 in FIG. 7. The surface Sc is a flat surface that is adjacent to the edge surface and is perpendicular to the optical axis Z. In this specification, this non-optically effective surface is referred to as a flat chamfered surface. The surface Sc which is the flat chamfered surface is formed in an annular shape outside the surface Sd which is a lens surface among the reduction-side surfaces of the lens. In the cross-sectional view of FIG. 7, the surface Sc is illustrated with a reference between the point P5 and the point P6 and between the point P9 and the point P10.

FIG. 6 illustrates an example in which the absorption layer 7 is provided on the entire flat chamfered region with an annular shape in the second lens L2. However, the portion in which the absorption layer 7 is provided is not limited thereto. The absorption layer 7 may be provided on a portion of the flat chamfered surface. In addition, the absorption layer 7 may be provided on at least a portion of the edge surface in addition to the flat chamfered surface or instead of the flat chamfered surface. In a case in which the lens has a non-optically effective surface having a shape different from that of the flat chamfered surface and the edge surface, the absorption layer 7 may be provided on the non-optically effective surface. Further, the absorption layer 7 may be provided on a portion of the optically effective surface as long as the rays for imaging are not blocked as needed.

The lens provided with the absorption layer 7 is not limited to the second lens L2. The absorption layer 7 may be provided in a lens other than the second lens L2. In addition, the number of lenses provided with the absorption layer 7 is not limited. The absorption layer 7 may be provided in the second lens L2 and one or more lenses that are closer to the reduction side than the second lens L2. In a case in which the third lens L3 and the fourth lens L4 that are disposed continuously with the second lens L2 are negative meniscus lenses as in this example, it is more preferable that the absorption layer 7 is also provided in the third lens L3 and the fourth lens L4.

In a case in which the absorption layer 7 is provided in the second lens L2, it is preferable to provide the absorption layer 7 in at least a portion of the non-optically effective surface of the second lens L2 and at least a part of the portion irradiated with light that has been emitted from a position at a height Y1 from the optical axis Z on the image and reflected by the enlargement-side surface of the first lens L1 or the reduction-side surface of the first lens L1. In a case in which the effective radius of the enlargement-side surface of the second lens L2 is h2$f$, the effective radius of the reduction-side surface of the first lens L1 is h1$r$, and the reduction-side maximum image height of the projection optical system 4 is Ymax, the height Y1 can be calculated from Y1=Ymax×h2$f$/h1$r$. In a case in which the center of an image circle of the projection optical system 4 is on the optical axis, the maximum image height Ymax is equal to the radius of the image circle.

Figure 8:
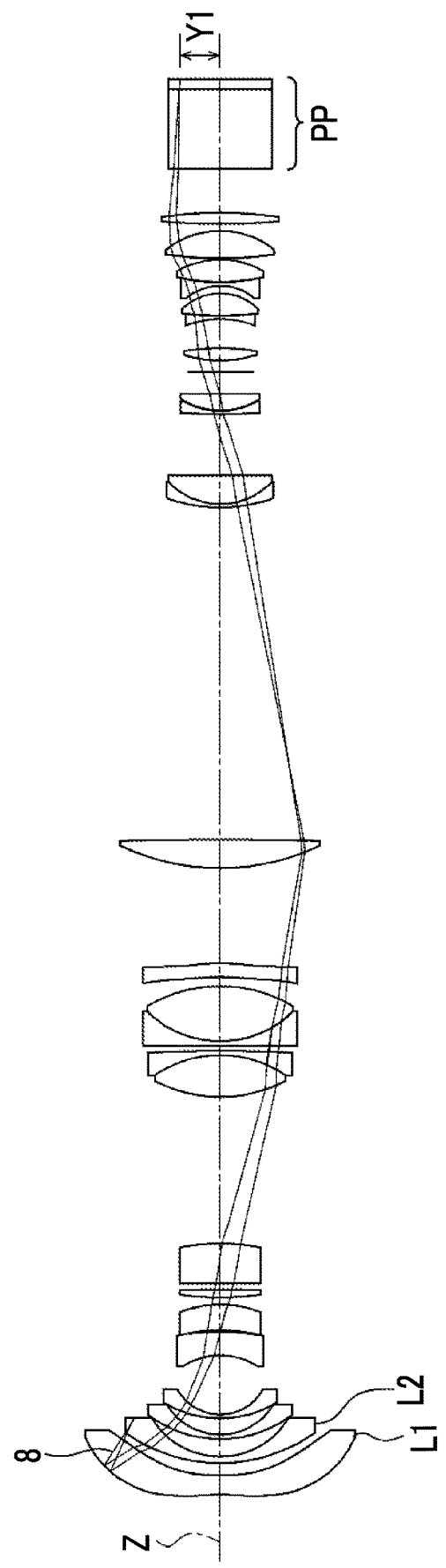
FIG. 8 is a diagram illustrating an optical path of light reflected by an enlargement-side surface of a first lens.
Figure 9:
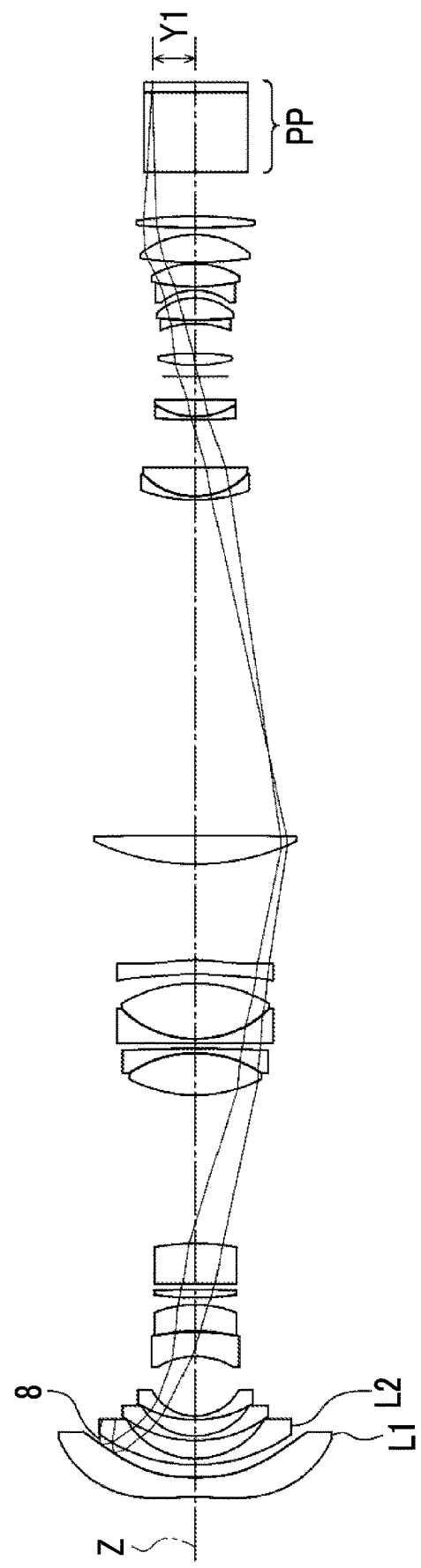
FIG. 9 is a diagram illustrating an optical path of light reflected by a reduction-side surface of the first lens.

FIG. 8 illustrates the result of ray tracing in a case in which light emitted from the position at the height Y1 from the optical axis Z on the image display surface is reflected by the enlargement-side surface of the first lens L1 in the projection optical system 4 before the absorption layer 7 is provided. Similarly, FIG. 9 illustrates the result of ray tracing in a case in which the light emitted from the position at the height Y1 from the optical axis Z on the image display surface is reflected by the reduction-side surface of the first lens L1 in the projection optical system 4 before the absorption layer 7 is provided. As illustrated in FIGS. 8 and 9, the light 8 reflected by the first lens L1 reaches the flat chamfered surface which is the non-optically effective surface of the second lens L2.

In the configuration with a low slow ratio, the enlargement-side surface of the first lens L1 and the reduction-side surface of the second lens L2 are likely to be close to each other. Therefore, in a case in which Ymax is a 100% image height, Y1 is likely to be an image height larger than a 50% image height. Therefore, the light emitted from the position at the height Y1 is likely to reach the peripheral portion of the first lens L1 or the vicinity of the peripheral portion. In this example, the peripheral portion of the enlargement-side surface of the first lens L1 has a convex shape and the peripheral portion of the reduction-side surface of the first lens L1 has a concave shape. Therefore, the light 8 reflected by the peripheral portion of the first lens L1 or the vicinity of the peripheral portion is likely to return to the non-optically effective surface of the second lens L2. From this circumstance, it is useful to provide the absorption layer 7, paying attention to the light emitted from the position at the height Y1.

Figure 10:
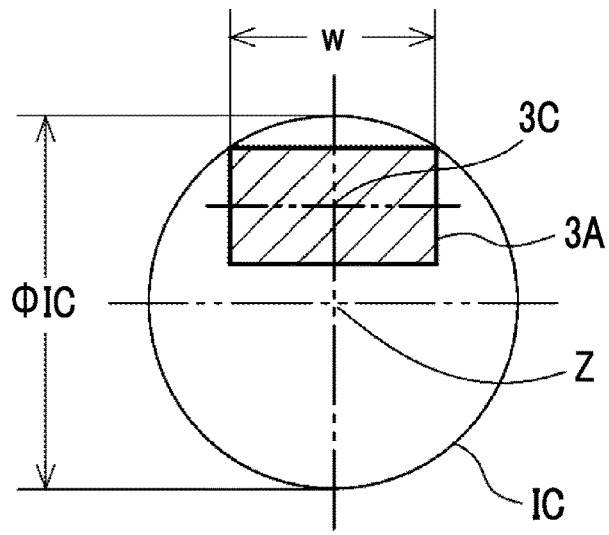
FIG. 10 is a diagram illustrating an example of the disposition of a displayable region in an image circle.

Further, in some cases, the projection-type display device 1 performs a so-called lens shift operation that relatively moves the projection optical system 4 with respect to the display element 3 in a plane perpendicular to the optical axis Z. In this case, for example, as illustrated in FIG. 10, the displayable region 3A of the display element 3 may be located at a position that deviates from the optical axis Z. FIG. 10 illustrates the position of the displayable region 3A in an image circle IC of the projection optical system 4. Even in this case, since the position at the height Y1 (see FIG. 9) is likely to be within the displayable region 3A, it is useful to provide the absorption layer 7, paying attention to the light emitted from the position at the height Y1.

In addition, in a case in which the diameter of the image circle IC of the projection optical system 4 is ΦIC and the length of the long side of the displayable region 3A is w, it is preferable that w/ΦIC is equal to or less than 0.7. In the projection-type display device 1 with a low slow ratio, the projection-type display device 1 and the screen 5 are close to each other. Therefore, in many cases, the lens is shifted such that the center of the projection image 6 deviates from the optical axis Z of the projection optical system 4, and the projection image 6 is projected onto the screen in order for the user to easily see the projection image 6. For example, in a case in which the projection image 6 is projected onto the screen disposed on a wall surface in a room, so-called launch projection may be performed in which the projection position of the projection image 6 is brought close to the ceiling by lens shifting in a state in which the projection-type display device 1 is disposed at a position close to a floor surface. Therefore, in the projection-type display device 1 with a low slow ratio, it is preferable to project the projection image 6 without omission even in a state in which a center 3C of the displayable region 3A deviates from the optical axis Z of the projection optical system 4. The setting of w/ΦIC to 0.7 or less makes it easy to project the projection image 6 without omission even in a state in which the center 3C deviates from the optical axis Z of the projection optical system 4.

In a case in which the absorption layer 7 is provided in the second lens L2, it is preferable that the projection optical system 4 satisfies the following Conditional Expression (3) for the disposition of the second lens L2.

Figure 11:
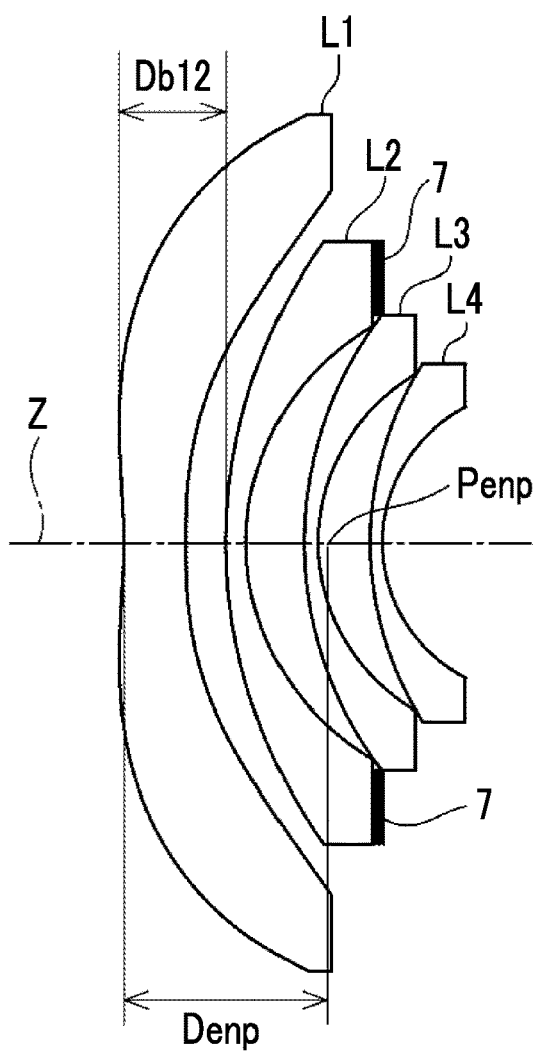
FIG. 11 illustrates an example of Db12, Denp, and Penp.

In Conditional Expression (3), the distance from the enlargement-side surface of the first lens L1 to the enlargement-side surface of the second lens L2 on the optical axis is Db12. Further, in a case in which the enlargement side is the incident side, the distance from the enlargement-side surface of the first lens L1 to a paraxial entrance pupil position Penp of the projection optical system 4 on the optical axis is Denp. The sign of Db12 is positive. The sign of Denp is positive in a case in which the paraxial entrance pupil position is closer to the reduction side than the enlargement-side surface of the first lens L1 on the optical axis and is negative in a case in which the paraxial entrance pupil position is closer to the enlargement side than the enlargement-side surface of the first lens L1. FIG. 11 is an enlarged view illustrating a main portion of the projection optical system 4 illustrated in FIG. 3 and illustrates, for example, Db12, Denp, and the paraxial entrance pupil position Penp. In a case in which the second lens L2 is disposed such that such that a value of Db12/Denp is not equal to or less than the lower limit of Conditional Expression (3), it is easy to prevent the interference between the reduction-side surface of the first lens L1 and the enlargement-side surface of the second lens L2. In a case in which the second lens L2 is disposed such that the value of Db12/Denp is not equal to or greater than the upper limit of Conditional Expression (3), it is easy to suppress an increase in the diameter of the first lens L1, and it is easy for the projection optical system to suitably absorb the light 8 reflected by the first lens L1.

$$0.2 < Db12/Denp < 1 \quad (3)$$

In a case in which the absorption layer 7 is provided in the second lens L2, it is preferable that the second lens L2 is a negative meniscus lens having a convex surface facing the enlargement side. In order to achieve a low slow ratio, it is required to dispose a lens having a large difference between the effective diameter of an enlargement-side surface and the effective diameter of a reduction-side surface in the vicinity of the reduction side of the first lens L1. The shape of the negative meniscus lens having a convex surface facing the enlargement side is suitable for this requirement. In particular, preferably, in the enlargement-side surface of the second lens L2, a portion from a point at a height of 70% of the effective radius to the outside in the radial direction has a convex shape. Preferably, in the reduction-side surface of the second lens L2, a portion from a point at a height of 70% of the effective radius to the outside in the radial direction has a concave shape.

As described above, it is preferable that the second lens L2 is a negative meniscus lens having a convex surface facing the enlargement side in order to achieve a low slow ratio. However, in a case in which the size of the optical system is reduced in the direction of the optical axis and the radial direction while the lens is formed in the above-mentioned shape, a shape in which the flat chamfered surface having a large width in the radial direction is disposed on the reduction side is likely to be formed. As the width of the flat chamfered surface becomes larger, the area in which scattered light is generated in a case in which the light 8 reflected by the first lens L1 reaches the flat chamfered surface becomes larger. From this circumstance, it can be said that the configuration in which the absorption layer 7 according to this example is provided is advantageous in suppressing a reduction in contrast due to stray light while reducing the slow ratio.

In a case in which the second lens L2 is a negative meniscus lens having a convex surface facing the enlargement side, it is preferable that the second lens L2 satisfies the following Conditional Expression (4).

Here, the paraxial radius of curvature of the enlargement-side surface of the second lens L2 is R2f, and the paraxial radius of curvature of the reduction-side surface of the second lens L2 is R2r. In a case in which the second lens L2 is configured such that a value of R2f/R2r is not equal to or less than the lower limit of Conditional Expression (4), it is easy to achieve a low slow ratio. In a case in which the second lens L2 is configured such that the value of R2f/R2r is not equal to or greater than the upper limit of Conditional Expression (4), it is easy to suppress an increase in the total optical length of the projection optical system 4 and to suppress an increase in the diameter of the first lens L1 since the depth of the reduction-side surface of the second lens L2 is not too large. In addition, the depth of the reduction-side surface of the second lens L2 means a length from the outer edge of the reduction-side optically effective surface of the second lens L2 to an intersection between the reduction-side surface of the second lens L2 and the optical axis Z in the direction of the optical axis. In order to obtain better characteristics, it is more preferable that the second lens LS satisfies the following Conditional Expression (4-1).

$$1.2 < R2f/R2r < 10 \quad (4)$$

$$1.5 < R2f/R2r < 5 \quad (4\text{-}1)$$

The first lens L1 may be configured to be an aspherical lens. The inclusion of the aspherical lens in the projection optical system 4 is advantageous for a small F-number, a wide angle of view, and good aberration correction. In particular, this configuration is very effective in correcting distortion in the optical system with a wide angle of view.

It is preferable that the enlargement-side surface of the first lens L1 has a shape in which an inflection point Pf is within the effective radius in the cross section that is parallel to the optical axis Z and includes the optical axis Z. In this case, the projection-type display device 1 with a low slow ratio is advantageous in forming the projection image 6 having a small distortion and a high resolution. For example, FIG. 4 illustrates the inflection point Pf on the enlargement-side surface of the first lens L1.

It is preferable that the enlargement-side surface of the first lens L1 has a concave shape in the paraxial region. In this case, the projection-type display device 1 with a low slow ratio is advantageous in forming the projection image 6 having a small distortion and a high resolution.

In a case in which the specific gravity of the material forming the first lens L1 is SGL1, it is preferable that SGL1 is equal to or less than 1.5. This case is advantageous in reducing weight. However, an optical material having a specific gravity of 1.5 or less is generally a resin, and an antireflection film made of the resin tends to have a higher reflectivity than that made of glass. From this circumstance, the configuration in which the absorption layer 7 according to this example is provided is advantageous in suppressing a reduction in contrast due to stray light and reducing the weight of the projection-type display device 1.

In the projection-type display device 1, it is preferable that the brightness of the light (projection light) for projecting the projection image 6 is equal to or greater than 5000 ANSI (American National Standards Institute) lumens. In this case, it is easy to obtain a clear projection image 6 even in an environment affected by external light or an environment such as a bright room. It is preferable to use a laser light source or a super high-pressure mercury lamp as the light source in order to obtain projection light with a brightness of 5000 ANSI lumens or more. Further, the light source may be configured to be a multi-lamp type, such as a 2-lamp type or a 4-lamp type. In this case, it is possible to increase the brightness of the projection light.

The projection-type display device 1 using a low-luminance light source has few problems even in an environment affected by external light since the amount of contrast reduction due to stray light is sufficiently small with respect to the luminance resolution of the human eye. However, in the projection-type display device 1 using a high-luminance light source, since the amount of contrast reduction due to stray light exceeds the luminance resolution of the human eye, the reduction in contrast is recognized. From this circumstance, the configuration in which the absorption layer 7 according to this example is provided is particularly useful in the projection-type display device 1 using the high-luminance light source.

An ANSI lumen measurement method is defined by ANSI and is roughly as follows. A projection surface is divided into 9 blocks of 3 rows and 3 columns, and the average illuminance is calculated. The unit of the average illuminance is lx (lux). The unit of the area of the projection surface is m² (square meter). Assuming that the unit of luminous flux is lm (lumen), since [lx]=[lm]/[m²] is established, the average illuminance can be multiplied by the area of the projection surface to calculate the value of ANSI lumen.

The above-mentioned preferred configurations and available configurations including the configurations relating to Conditional Expressions may be combined in any way, and it is preferable to appropriately selectively adopt the configurations in accordance with required specifications. In addition, the range of possible conditional expressions is not limited to the conditional expressions described in the form of expressions and includes a range obtained by combining the lower limit and the upper limit in any way from the preferable and more preferable conditional expressions.

Next, numerical examples of the projection-type display device according to the technology of the present disclosure will be described. Examples of the projection optical system are mainly given as the numerical examples. Hereinafter, projection optical systems used in projection-type display devices according to Examples 1, 2, and 3 are referred to as projection optical systems according to Examples 1, 2, and 3, respectively. In addition, the reference numerals attached to the cross-sectional views according to the following numerical examples are used independently for each example in order to avoid complication of explanation and drawings due to an increase in the number of digits of the reference numerals. Therefore, even in a case in which common reference numerals are attached in the drawings of different examples, components do not necessarily have a common configuration.

Example 1

The lens configuration of a projection optical system 4 and the cross-sectional view of luminous flux in Example 1 are the same as those in FIG. 3. Since the configuration and an illustration method are as described above, the description thereof will not be repeated here. The projection optical system 4 according to Example 1 is a relay-type optical system in which an intermediate image is formed. The optical system forming the intermediate image can suppress an increase in the diameter of an enlargement-side lens while ensuring a wide angle of view. Therefore, the optical system is suitable for a projection-type display device requiring a wide angle of view.

The projection optical system 4 according to Example 1 is a zoom lens. For the projection optical system 4 according to Example 1, Tables 1A and 1B illustrate basic lens data, Table 2 illustrates specifications, Table 3 illustrates a variable surface spacing, and Table 4 illustrates aspherical coefficients. Here, the basic lens data is divided and displayed in two tables of Table 1A and Table 1B in order to avoid an increase in the length of one table. All of the values in each of the above-mentioned tables are data in a case in which the values are standardized such that the absolute value of the focal length at the wide-angle end of the projection optical system 4 is 1.

Tables 1A and 1B are described as follows. A column of Sn indicates a surface number in a case in which a surface closest to the enlargement side is a first surface and the number is increased one by one toward the reduction side. A column of R indicates the radius of curvature of each surface. A column of D indicates a surface spacing between each surface and a surface adjacent to the reduction side of the surface on the optical axis. A column of Nd indicates the refractive index of each component with respect to the d-line. A column of vd indicates the Abbe number of each component based on the d-line. The effective radius is illustrated for the first to third surfaces. Tables 1A and 1B illustrate the values in a case in which the projection distance is 150. The wavelength of the d-line is treated as 587.56 nanometers (nm).

In Tables 1A and 1B, the sign of the radius of curvature of a surface having a convex shape toward the enlargement side is positive, and the sign of the radius of curvature of a surface having a convex shape toward the reduction side negative. In Table 1B, the surface number and a term of (St) are described in the surface number field of a surface corresponding to the aperture stop St. In Table 1B, a symbol DD[ ] is used for the variable surface spacing during variable magnification, and the enlargement-side surface number corresponding to the spacing is given in [ ] and is entered in the field D. The value in the lowest field of the column of D in Table 1B is the distance from the surface closest to the reduction side in the table to the image display surface of the display element 3.

In Table 2, for the projection optical system 4 according to Example 1, a zoom ratio Zr, the absolute value of the focal length |f|, a back focus Bf at an air conversion distance, and an F-number FNo., and the maximum total angle of view 2ω are illustrated on the basis of the d-line. (°) in the field of 2ω indicates that the unit thereof is a degree. Table 3 illustrates the variable surface spacing. Tables 2 and 3 illustrate the columns in which values at a wide-angle end and a telephoto end are represented by WIDE and TELE, respectively.

In the basic lens data, a reference sign * is attached to the surface number of an aspherical surface, and the numerical value of the paraxial radius of curvature is written into the field of the radius of curvature of the aspherical surface. In Table 3, a column of Sn indicates the surface number of the aspherical surface, and rows of KA and Am indicate the numerical values of the aspherical coefficients for each aspherical surface. m is an integer 3 or more. For example, m is 3, 4, 5, . . . , 20 for the aspherical surfaces in Example 1. "E±n" (n: an integer) in the numerical values of the aspherical coefficients in Table 4 means "×10$^{±n}$". KA and Am are aspherical coefficients in an aspheric equation represented by the following expression.

$$Zd = C \times H^2 / \{1 + (1 - KA \times C^2 \times H^2)^{1/2}\} + \Sigma Am \times H^m$$

Here, Zd is the depth of an aspherical surface (the length of a perpendicular line drawn from a point on an aspherical surface at a height H to a plane that is perpendicular to the optical axis Z and is tangent to the vertex of the aspherical surface), H is a height (a distance from the optical axis Z to a lens surface), C is the reciprocal of the paraxial radius of curvature, KA and Am are aspherical coefficients, and $\Sigma$ in the aspheric equation means the sum with respect to m.

TABLE 1A

Example 1

| Sn | R | D | Nd | vd | Effective radius |
|---|---|---|---|---|---|
| *1 | −6.5174 | 1.1220 | 1.53158 | 55.08 | 7.6758 |
| *2 | −80.9120 | 0.7204 | | | 6.2136 |
| 3 | 9.7069 | 0.3607 | 1.77250 | 49.62 | 5.5150 |
| 4 | 4.6728 | 1.0349 | | | |
| 5 | 7.0426 | 0.2505 | 1.84666 | 23.78 | |
| 6 | 3.6305 | 0.9412 | | | |
| 7 | 6.2331 | 0.2204 | 1.77250 | 49.62 | |
| 8 | 2.8379 | 3.3360 | | | |
| 9 | −3.9908 | 1.3742 | 1.48749 | 70.42 | |
| 10 | −14.5015 | 0.0866 | | | |
| 11 | −9.7024 | 1.5084 | 1.51742 | 52.19 | |
| 12 | −6.2157 | 0.5080 | | | |
| 13 | 17.0987 | 0.4537 | 1.80518 | 25.46 | |
| 14 | −77.2644 | 0.3481 | | | |
| 15 | ∞ | 2.2927 | 1.77249 | 49.58 | |
| 16 | −11.5920 | 8.5350 | | | |
| 17 | 8.1972 | 2.4164 | 1.49700 | 81.61 | |
| 18 | −6.8302 | 0.2605 | 1.84666 | 23.78 | |
| 19 | −84.5777 | 0.3106 | | | |
| 20 | ∞ | 0.2505 | 1.84666 | 23.78 | |
| 21 | 6.1517 | 3.1537 | 1.59282 | 68.62 | |
| 22 | −8.4172 | 0.5510 | | | |
| *23 | −10.5813 | 0.8015 | 1.51649 | 64.00 | |
| *24 | −8.0156 | 5.5260 | | | |
| 25 | 13.7089 | 1.6570 | 1.84666 | 23.79 | |
| 26 | −257.5877 | DD[26] | | | |

TABLE 1B

Example 1

| Sn | R | D | Nd | vd |
|---|---|---|---|---|
| 27 | 9.0401 | 0.2004 | 1.84666 | 23.78 |
| 28 | 4.1389 | 1.6670 | 1.80610 | 33.27 |
| 29 | ∞ | DD[29] | | |
| 30 | 28.0617 | 0.1803 | 1.84666 | 23.79 |
| 31 | 4.0750 | 0.0210 | | |
| 32 | 4.2124 | 0.9617 | 1.51680 | 64.21 |
| 33 | ∞ | 1.3164 | | |
| 34(St) | ∞ | 0.6612 | | |
| 35 | 7.4977 | 0.6973 | 1.80518 | 25.45 |
| 36 | −12.8277 | 1.7011 | | |
| 37 | −5.2953 | 0.1803 | 1.91083 | 35.26 |
| 38 | 16.5075 | 0.0262 | | |
| 39 | 21.5621 | 1.2743 | 1.48749 | 70.42 |
| 40 | −3.1501 | 0.4448 | | |
| 41 | −3.0305 | 0.2004 | 1.80401 | 46.57 |
| 42 | 10.4311 | 0.0202 | | |
| 43 | 11.3321 | 1.2723 | 1.49700 | 81.59 |
| 44 | −4.9854 | 0.0801 | | |
| 45 | 23.3113 | 1.5929 | 1.49700 | 81.59 |
| 46 | −5.0487 | DD[46] | | |

TABLE 1B-continued

Example 1

| Sn | R | D | Nd | vd |
|---|---|---|---|---|
| 47 | 40.8512 | 0.6492 | 1.84666 | 23.79 |
| 48 | −23.8677 | 2.5736 | | |
| 49 | ∞ | 4.6084 | 1.51633 | 64.14 |
| 50 | ∞ | 0.6011 | 1.48749 | 70.44 |
| 51 | ∞ | 0.0000 | | |

TABLE 2

Example 1

| | WIDE | TELE |
|---|---|---|
| Zr | 1.0 | 1.1 |
| \|f\| | 1.000 | 1.000 |
| Bf | 6.017 | 6.017 |
| FNo. | 2.30 | 2.39 |
| 2ω(°) | 137.3 | 133.6 |

TABLE 3

Example 1

| | WIDE | TELE |
|---|---|---|
| DD[26] | 19.1962 | 17.8597 |
| DD[29] | 2.7430 | 3.2211 |
| DD[46] | 0.4007 | 1.2591 |

TABLE 4

Example 1

| Sn | 1 | 2 |
|---|---|---|
| KA | −7.61482685625062E−01 | −3.48820069068000E−02 |
| A3 | 4.48718620163584E−02 | 5.26539429009046E−02 |
| A4 | −1.25772376578764E−02 | −2.35192827713908E−02 |
| A5 | 1.17328974454347E−03 | 6.09684940425733E−03 |
| A6 | 1.01150440615941E−03 | −3.45842722148364E−04 |
| A7 | −4.71087645667198E−04 | −1.93057761376087E−04 |
| A8 | 5.32606619184818E−05 | 5.25113521330363E−06 |
| A9 | 1.64402892568592E−05 | 2.37333347730899E−05 |
| A10 | −5.33677323459338E−06 | −5.38557720854881E−06 |
| A11 | 1.01752307653625E−07 | −4.16550452563486E−07 |
| A12 | 1.56359748385448E−07 | 2.73855412981765E−07 |
| A13 | −1.73864392822687E−08 | −1.44951161570651E−08 |
| A14 | −1.82500146779321E−09 | −5.54968462788549E−09 |
| A15 | 4.04244560136768E−10 | 6.68051901507013E−10 |
| A16 | 7.23061816136780E−13 | 4.19540150418387E−11 |
| A17 | −3.99331066614575E−12 | −9.81488014276557E−12 |
| A18 | 1.54374047192545E−13 | 1.26824795376705E−13 |
| A19 | 1.49100996101607E−14 | 5.03747976356693E−14 |
| A20 | −9.08964200558995E−16 | −2.37731880897422E−15 |

| Sn | 23 | 24 |
|---|---|---|
| KA | 1.00000000000000E+00 | 1.00000000000000E+00 |
| A3 | 0.00000000000000E+00 | 0.00000000000000E+00 |
| A4 | 7.15591450372122E−03 | 9.08219004449408E−03 |
| A5 | −7.28524932121258E−04 | −2.16902335677088E−03 |
| A6 | −2.09657235618946E−04 | 7.63384665063739E−04 |
| A7 | 1.17197447730854E−04 | 1.12209225993568E−04 |
| A8 | −8.32628208165924E−05 | −2.81537578189635E−04 |
| A9 | −1.03924089404257E−05 | 4.03326112910139E−05 |
| A10 | 1.53231447272433E−05 | 2.80828926771231E−05 |
| A11 | 6.23607845585638E−07 | −6.42560572520872E−06 |
| A12 | −1.42481529337400E−06 | −1.40429736602950E−06 |
| A13 | −3.64647242255253E−08 | 4.20407043947482E−07 |
| A14 | 8.32111465848716E−08 | 3.71655073382448E−08 |

TABLE 4-continued

Example 1

| | | |
|---|---|---|
| A15 | 1.64435005616520E-09 | -1.43756290825877E-08 |
| A16 | -3.00484641194511E-09 | -4.48943083704988E-10 |
| A17 | -3.92053540813775E-11 | 2.53144261697222E-10 |
| A18 | 6.02641609392248E-11 | 4.34490124357363E-13 |
| A19 | 3.53747727584050E-13 | -1.81671241627088E-12 |
| A20 | -5.08288253295518E-13 | 2.64222121888157E-14 |

In each of the above-mentioned tables, numerical values rounded off to a predetermined digit are described. The symbols, meanings, description methods, and illustration methods of each data item according to Example 1 are basically the same as those in the following examples, unless otherwise specified.

Modification Example of Projection Optical System According to Example 1

Figure 12:
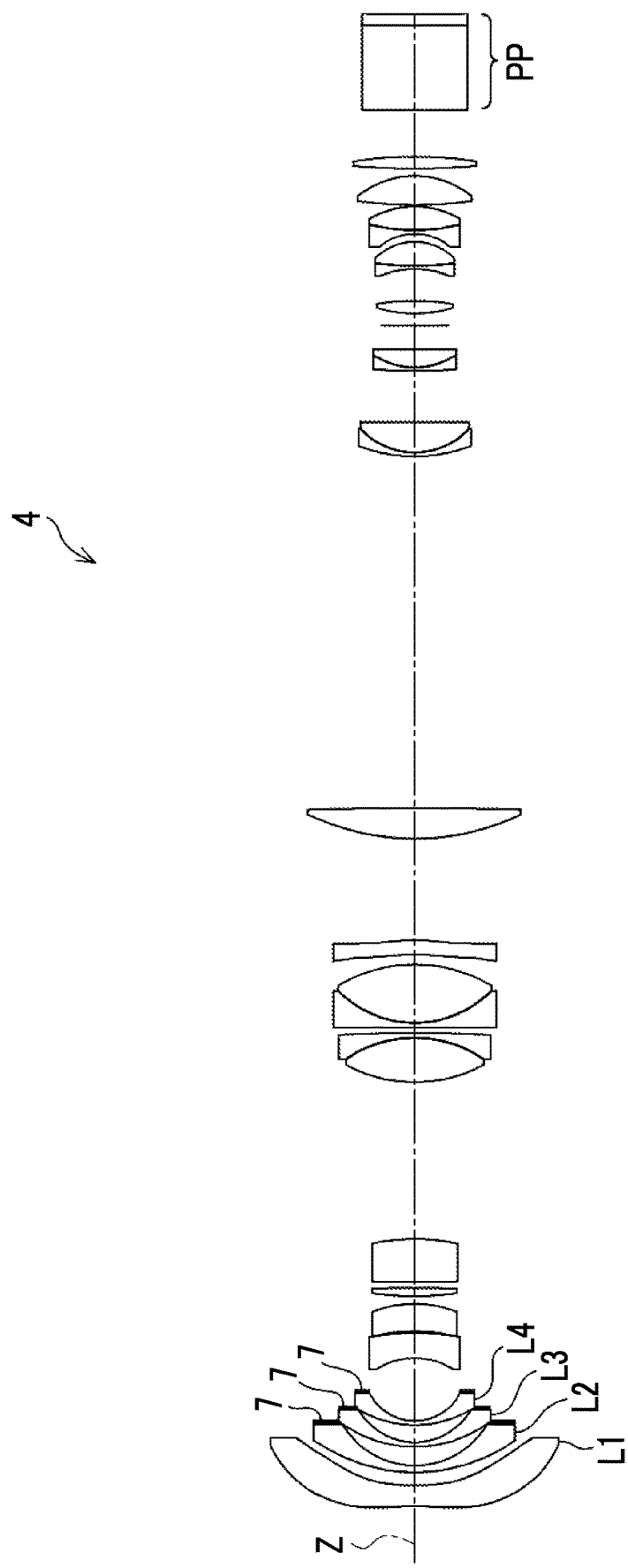
FIG. 12 is a diagram illustrating a configuration of a modification example of the projection optical system according to Example 1.

FIG. 12 illustrates the configuration of a projection optical system 4 according to a modification example of the projection optical system 4 according to Example 1. The lens configuration of this modification example is the same as that of the projection optical system 4 according to Example 1 illustrated in FIG. 3. The example illustrated in FIG. 12 differs from the example illustrated in FIG. 3 in that the absorption layer 7 is additionally provided on a flat chamfered surface of the reduction-side surface of the third lens L3 and a flat chamfered surface of the reduction-side surface of the fourth lens L4. The flat chamfered surface of the third lens L3 and the flat chamfered surface of the fourth lens L4 are non-optically effective surfaces.

Example 2

Figure 13:
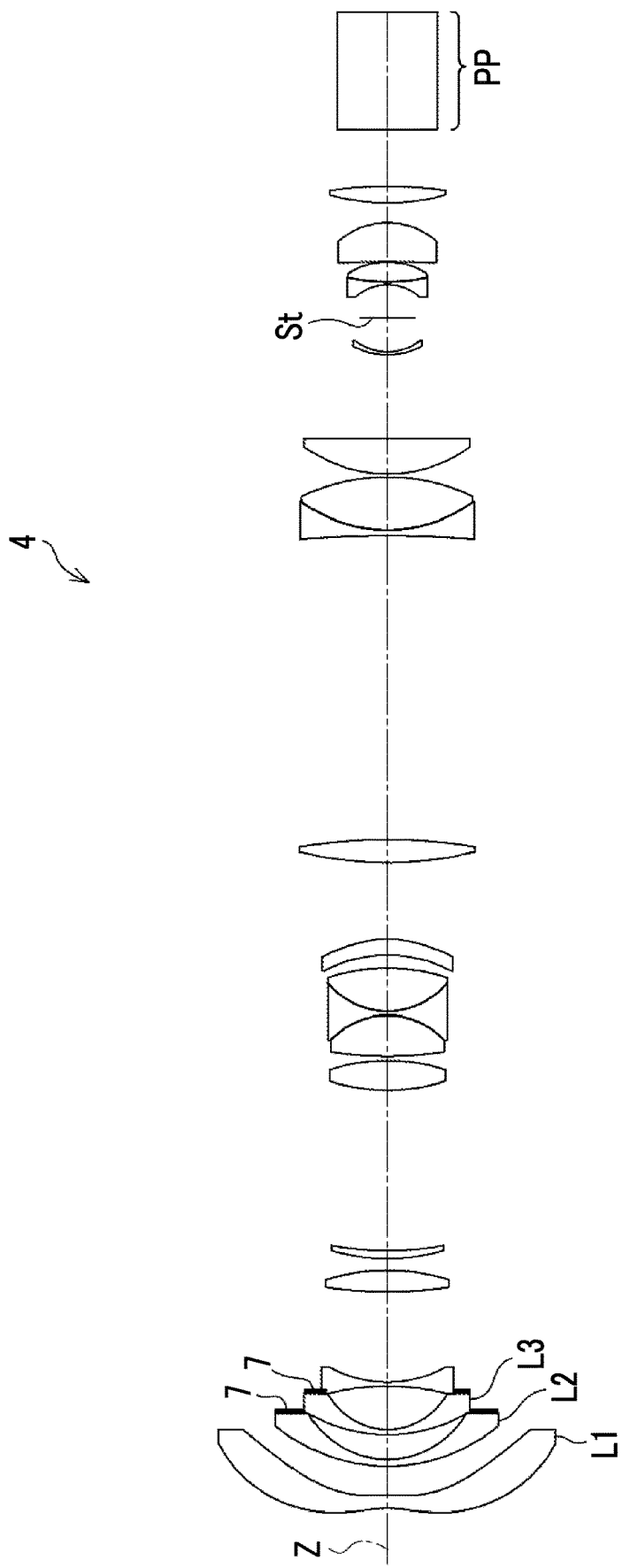
FIG. 13 is a diagram illustrating a configuration of a projection optical system according to Example 2.

FIG. 13 illustrates the configuration of a projection optical system 4 according to Example 2. The projection optical system 4 according to Example 2 is a single-focus optical system. The projection optical system 4 according to Example 2 comprises a first lens L1, a second lens L2, and a third lens L3 which are continuously arranged in order from the enlargement side to the reduction side along the optical axis Z. A peripheral portion of an enlargement-side surface of the first lens L1 has a shape in which a convex surface faces the enlargement side. The second lens L2 and the third lens L3 are negative meniscus lenses that have convex surfaces facing the enlargement side. The absorption layer 7 is provided on a flat chamfered surface of the second lens L2 and a flat chamfered surface of the third lens L3.

The projection optical system 4 according to Example 2 comprises a plurality of lenses, an aperture stop St, and an optical member PP which are provided closer to the reduction side than the third lens L3. In FIG. 13, the reference numerals of the lenses which are closer to the reduction side than the third lens L3 are not illustrated.

For the projection optical system 4 according to Example 2, Table 5 illustrates basic lens data, Table 6 illustrates specifications, Table 7 illustrates a variable surface spacing during focusing, and Table 8 illustrates aspherical coefficients. In Table 5, the symbol DD[ ] is used for each variable surface spacing during focusing, and the enlargement-side surface number corresponding to the spacing is given in [ ] and is entered in the field D. Table 7 illustrates the value of the variable surface spacing at each projection distance. All of the values in each of Tables 5 to 8 are data in a case in which the values are standardized such that the absolute value of the focal length of the projection optical system 4 is 1.

TABLE 5

Example 2

| Sn | R | D | Nd | vd | Effective radius |
|---|---|---|---|---|---|
| *1 | -5.2258 | 0.7360 | 1.53158 | 55.08 | 9.9982 |
| *2 | -14.4830 | 1.6688 | | | 8.2663 |
| 3 | 10.9737 | 0.3937 | 1.83481 | 42.72 | 6.3448 |
| 4 | 5.6865 | 1.4329 | | | |
| 5 | 10.0545 | 0.2995 | 1.91082 | 35.25 | |
| 6 | 4.2275 | 2.5121 | | | |
| 7 | -15.2778 | 0.2311 | 1.72916 | 54.68 | |
| 8 | 7.6744 | 5.2322 | | | |
| 9 | 28.2991 | 1.2357 | 1.80610 | 33.27 | |
| 10 | -13.1238 | DD[10] | | | |
| 11 | 12.6584 | 0.4655 | 1.84666 | 23.78 | |
| 12 | 19.8736 | DD[12] | | | |
| 13 | 12.0143 | 1.7218 | 1.49700 | 81.61 | |
| 14 | -12.0143 | 0.2516 | | | |
| 15 | 24.8613 | 2.3517 | 1.67790 | 55.34 | |
| 16 | -4.8915 | 0.2311 | 1.80518 | 25.46 | |
| 17 | 4.8915 | 2.4852 | 1.49700 | 81.61 | |
| 18 | -12.0513 | 0.7514 | | | |
| *19 | -7.1510 | 0.9414 | 1.51007 | 56.24 | |
| *20 | -5.3495 | 4.4056 | | | |
| 21 | 22.9057 | 1.3282 | 1.84666 | 23.78 | |
| 22 | -34.7748 | 17.5452 | | | |
| 23 | -64.7115 | 0.3252 | 1.80610 | 33.27 | |
| 24 | 9.2416 | 3.0414 | 1.63854 | 55.38 | |
| 25 | -12.6122 | 0.1712 | | | |
| 26 | 8.7758 | 2.0539 | 1.69680 | 55.53 | |
| 27 | ∞ | 4.7924 | | | |
| 28 | 4.6731 | 0.1729 | 1.59270 | 35.31 | |
| 29 | 3.4032 | 1.9837 | | | |
| 30(St) | ∞ | 1.8913 | | | |
| 31 | -3.0344 | 0.1712 | 1.80518 | 25.46 | |
| 32 | 12.6113 | 1.1057 | 1.59282 | 68.62 | |
| 33 | -4.8375 | 0.0342 | | | |
| 34 | -57.4762 | 2.2421 | 1.49700 | 81.61 | |
| 35 | -4.7173 | 1.1502 | | | |
| 36 | 13.8428 | 0.9568 | 1.92286 | 20.88 | |
| 37 | -27.2944 | 3.2889 | | | |
| 38 | ∞ | 6.7786 | 1.51633 | 64.14 | |
| 39 | ∞ | 0.0000 | | | |

TABLE 6

Example 2

| | |
|---|---|
| \|f\| | 1.00 |
| Bf | 7.76 |
| FNo. | 1.91 |
| 2ω(°) | 138.0 |

TABLE 7

Example 2

| | Projection distance 193.406 | Projection distance 121.521 | Projection distance 468.967 |
|---|---|---|---|
| DD[10] | 0.6421 | 0.8789 | 0.3986 |
| DD[12] | 9.2180 | 8.9812 | 9.4615 |

TABLE 8

Example 2

| Sn | 1 | 2 |
|---|---|---|
| KA | -1.546378300122E+00 | -6.938246778737E+01 |
| A3 | 2.018863389167E-02 | 3.135869415357E-02 |
| A4 | 3.047810683562E-03 | -2.989646897191E-02 |
| A5 | -1.669807535484E-03 | 3.677207805828E-02 |

TABLE 8-continued

Example 2

| | | |
|---|---|---|
| A6 | 1.154294171845E−04 | −2.990889576397E−02 |
| A7 | 3.249222906876E−05 | 1.666983136218E−02 |
| A8 | −4.253102539216E−06 | −6.627516042915E−03 |
| A9 | −4.424038232000E−07 | 1.914682928514E−03 |
| A10 | 8.245832143873E−08 | −4.053401733698E−04 |
| A11 | 4.288038152692E−09 | 6.288867705223E−05 |
| A12 | −1.009517143718E−09 | −7.077805600361E−06 |
| A13 | −3.928910017049E−11 | 5.629944648839E−07 |
| A14 | 9.188892344839E−12 | −2.997619234324E−08 |
| A15 | 2.854707126548E−13 | 9.489436391692E−10 |
| A16 | −6.073887356486E−14 | −1.286239784502E−11 |
| A17 | −1.058687065632E−15 | 1.516543284299E−14 |
| A18 | 2.357443732956E−16 | −4.670276371805E−15 |
| A19 | 1.116119782618E−18 | −3.190130207468E−17 |
| A20 | −3.658215332719E−19 | 1.042364006359E−17 |
| Sn | 19 | 20 |
| KA | −4.260756389852E−01 | 5.923802980090E−01 |
| A3 | −5.094545177229E−03 | −4.049535376063E−03 |
| A4 | 1.311855979326E−02 | 1.205983297241E−02 |
| A5 | −5.611217310945E−03 | −3.710237995376E−03 |
| A6 | −1.633075426131E−03 | −6.446587800793E−04 |
| A7 | 2.434226410868E−03 | 9.705857875631E−04 |
| A8 | −3.423229558501E−04 | −1.036740768513E−04 |
| A9 | −4.527267198745E−04 | −1.481035527610E−04 |
| A10 | 1.544918621372E−04 | 3.796487747518E−05 |
| A11 | 3.707454554667E−05 | 1.139864470430E−05 |
| A12 | −2.337823471038E−05 | −5.114123231341E−06 |
| A13 | −2.029922108751E−07 | −1.533820057677E−07 |
| A14 | 1.728137683772E−06 | 3.274692501526E−07 |
| A15 | −1.756408094208E−07 | −3.329005538927E−08 |
| A16 | −5.970062664740E−08 | −8.904987889237E−09 |
| A17 | 1.113194098830E−08 | 1.988014493344E−09 |
| A18 | 5.447426702441E−10 | 1.706750172651E−11 |
| A19 | −2.180703780510E−10 | −3.433778947339E−11 |
| A20 | 1.042467028344E−11 | 2.361405547132E−12 |

Figure 14:
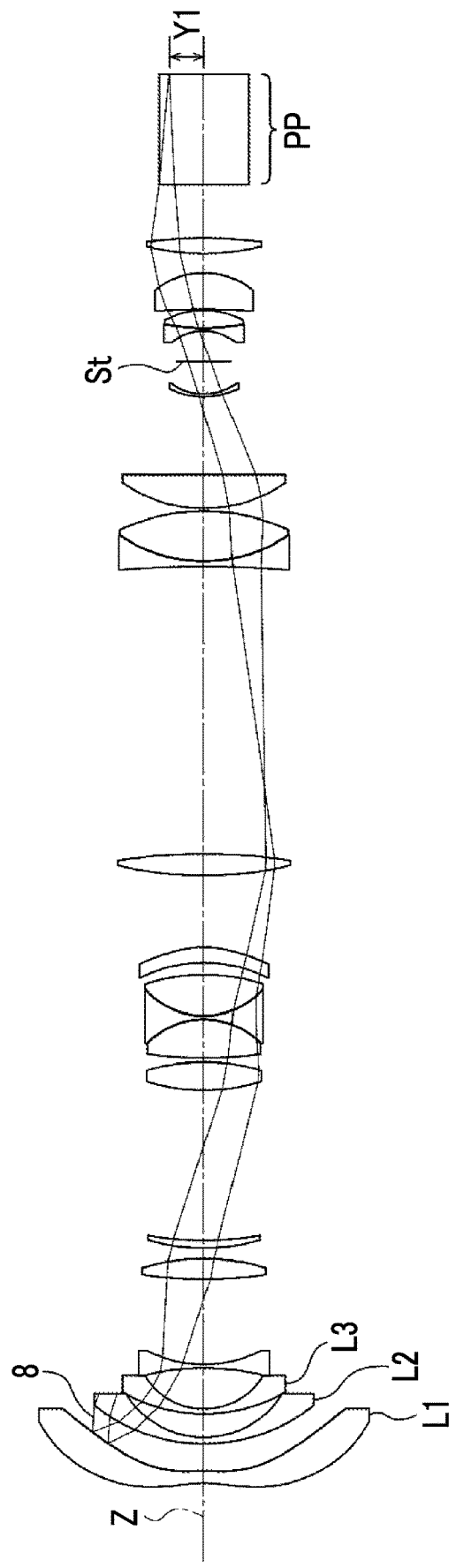
FIG. 14 is a diagram illustrating an optical path of light reflected by the reduction-side surface of the first lens.

FIG. 14 illustrates the result of ray tracing in a case in which light emitted from the position at the height Y1 from the optical axis Z on the image display surface is reflected by a reduction-side surface of the first lens L1 in the projection optical system 4 before the absorption layer 7 is provided. The light 8 reflected by the reduction-side surface of the first lens L1 reaches the flat chamfered surface which is the non-optically effective surface of the second lens L2.

Example 3

Figure 15:
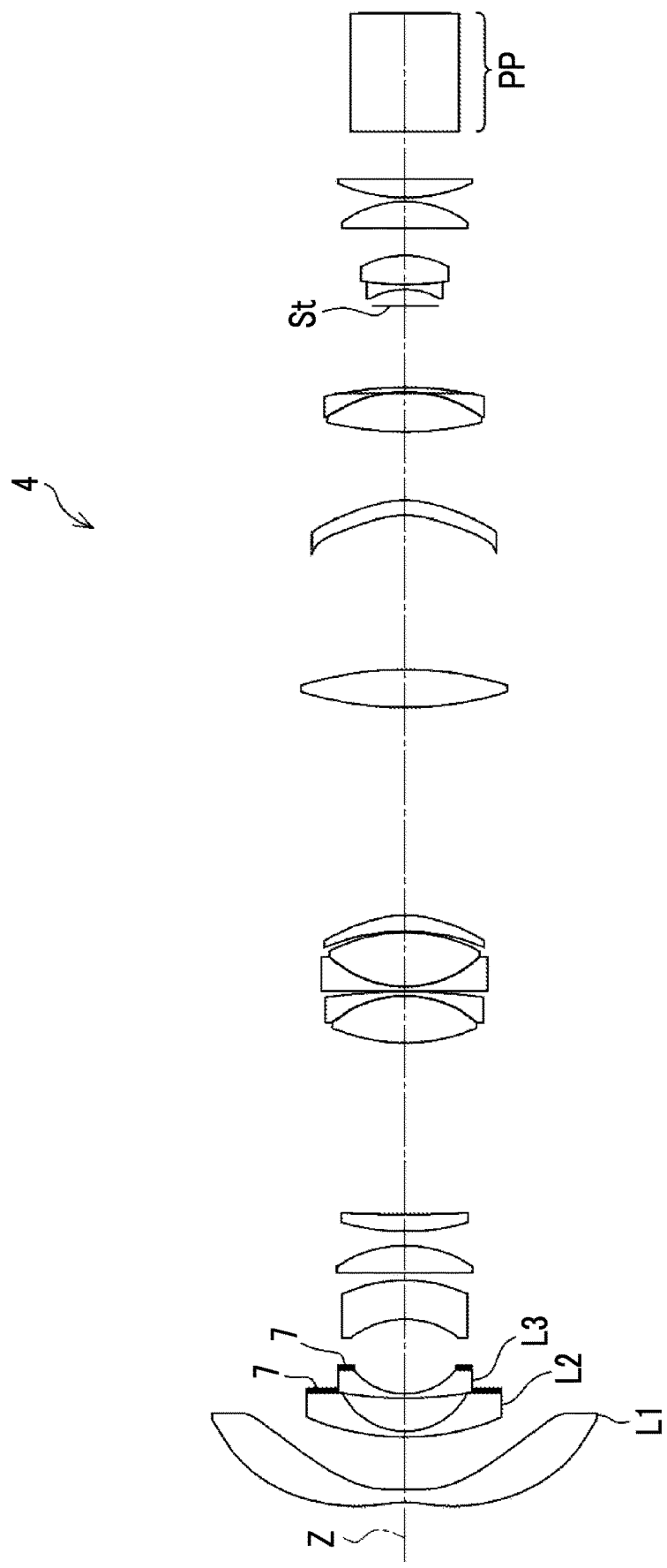
FIG. 15 is a diagram illustrating a configuration of a projection optical system according to Example 3.

A projection optical system 4 used in a projection-type display device according to Example 3 will be described. FIG. 15 illustrates the configuration of the projection optical system 4 according to Example 3. The projection optical system 4 according to Example 3 is a single-focus optical system. The projection optical system 4 according to Example 3 comprises a first lens L1, a second lens L2, and a third lens L3 which are continuously provided in order from the enlargement side to the reduction side along the optical axis Z. A peripheral portion of an enlargement-side surface of the first lens L1 has a shape in which a convex surface faces the enlargement side. The second lens L2 and the third lens L3 are negative meniscus lenses that have convex surfaces facing the enlargement side. The absorption layer 7 is provided on a flat chamfered surface of the second lens L2 and a flat chamfered surface of the third lens L3.

The projection optical system 4 according to Example 3 comprises a plurality of lenses, an aperture stop St, and an optical member PP which are provided closer to the reduction side than the third lens L3. In FIG. 15, the reference numerals of the lenses which are closer to the reduction side than the third lens L3 are not illustrated.

For the projection optical system 4 according to Example 3, Table 9 illustrates basic lens data, Table 10 illustrates specifications, Table 11 illustrates a variable surface spacing during focusing, and Table 12 illustrates aspherical coefficients. In Table 9, the symbol DD[ ] is used for each variable surface spacing during focusing, and the enlargement-side surface number corresponding to the spacing is given in [ ] and is entered in the field D. Table 11 illustrates the value of the variable surface spacing at each projection distance. All of the values in each of Tables 9 to 12 are data in a case in which the values are standardized such that the absolute value of the focal length of the projection optical system 4 is 1.

TABLE 9

Example 3

| Sn | R | D | Nd | vd | Effective radius |
|---|---|---|---|---|---|
| *1 | −3.8571 | 0.8488 | 1.53158 | 55.08 | 11.8394 |
| *2 | −8.2981 | 3.4286 | | | 9.4733 |
| 3 | 15.6205 | 0.3858 | 1.83400 | 37.16 | 6.0591 |
| 4 | 4.4969 | 2.1774 | | | |
| 5 | 24.2091 | 0.2829 | 1.83481 | 42.74 | |
| 6 | 4.2319 | DD[6] | | | |
| 7 | −5.5308 | 2.5515 | 1.60311 | 60.64 | |
| 8 | −9.5531 | DD[8] | | | |
| 9 | ∞ | 1.7413 | 1.48749 | 70.44 | |
| 10 | −7.8461 | DD[10] | | | |
| 11 | 14.6990 | 1.1009 | 1.80518 | 25.46 | |
| 12 | 75.1118 | 11.2992 | | | |
| 13 | 11.5142 | 3.0531 | 1.58313 | 59.37 | |
| 14 | −7.0887 | 0.2701 | 1.84667 | 23.79 | |
| 15 | −35.2560 | 0.0514 | | | |
| 16 | ∞ | 0.2906 | 1.84667 | 23.79 | |
| 17 | 6.9385 | 3.5598 | 1.48749 | 70.44 | |
| 18 | −10.0146 | 0.0772 | | | |
| *19 | −11.6678 | 1.0546 | 1.51007 | 56.24 | |
| *20 | −6.1750 | 13.5729 | | | |
| 21 | 21.7259 | 2.4898 | 1.51680 | 64.20 | |
| 22 | −21.7259 | 10.1185 | | | |
| *23 | −6.0808 | 0.9774 | 1.51007 | 56.24 | |
| *24 | −6.2670 | 4.5217 | | | |
| 25 | 20.2149 | 2.6287 | 1.83481 | 42.74 | |
| 26 | −8.1700 | 0.2855 | 1.80518 | 25.46 | |
| 27 | −22.1437 | 5.3859 | | | |
| 28(St) | ∞ | 1.0623 | | | |
| 29 | −4.3426 | 0.3087 | 1.84667 | 23.79 | |
| 30 | 16.4776 | 0.0183 | | | |
| 31 | 18.2604 | 1.8673 | 1.48749 | 70.44 | |
| 32 | −5.6543 | 1.7876 | | | |
| 33 | ∞ | 1.7619 | 1.48749 | 70.44 | |
| 34 | −6.6820 | 0.2598 | | | |
| 35 | 10.3973 | 1.2243 | 1.80518 | 25.46 | |
| 36 | ∞ | 3.1269 | | | |
| 37 | ∞ | 7.7402 | 1.51680 | 64.20 | |
| 38 | ∞ | 0.0429 | | | |

TABLE 10

Example 3

| | |
|---|---|
| |f| | 1.00 |
| Bf | 8.26 |
| FNo. | 1.60 |
| 2ω(°) | 141.2 |

TABLE 11

Example 3

| | Projection distance 121.4 | Projection distance 74.6 | Projection distance 204.8 | Projection distance Infinity |
|---|---|---|---|---|
| DD[6] | 4.9124 | 4.6454 | 5.0629 | 5.2562 |
| DD[8] | 0.5098 | 0.7017 | 0.4016 | 0.2627 |
| DD[10] | 0.9488 | 1.0239 | 0.9065 | 0.8521 |

TABLE 12

Example 3

| Sn | 1 | 2 | 19 |
|---|---|---|---|
| KA | −5.34602989E−01 | −2.99394974E+00 | −3.18695525E+00 |
| A3 | 4.41588815E−02 | 5.37701658E−02 | 0.00000000E+00 |
| A4 | −4.44842172E−04 | −2.00987958E−02 | 6.12198632E−04 |
| A5 | −2.35716150E−03 | 1.25065914E−02 | −1.44395234E−04 |
| A6 | 2.82162329E−04 | −5.16554571E−03 | 2.81201916E−04 |
| A7 | 4.52974801E−05 | 9.72821213E−04 | −1.51554354E−04 |
| A8 | −9.31391910E−06 | −3.34967083E−05 | −2.49014766E−06 |
| A9 | −4.39796856E−07 | −1.44651319E−05 | 2.03060244E−05 |
| A10 | 1.68438416E−07 | 1.77491054E−06 | −4.33605781E−06 |
| A11 | −1.26291212E−10 | −7.30888324E−08 | −9.64760510E−07 |
| A12 | −1.79919532E−09 | 1.73442401E−08 | 4.58043064E−07 |
| A13 | 4.67203905E−11 | −1.48625471E−09 | 1.98820490E−09 |
| A14 | 1.15610664E−11 | −3.04207065E−10 | −2.03535932E−08 |
| A15 | −4.79360450E−13 | 8.88022477E−12 | 1.24116290E−09 |
| A16 | −4.17565489E−14 | 1.16943716E−11 | 4.36306991E−10 |
| A17 | 2.17631331E−15 | −1.78574694E−12 | −3.33503826E−11 |
| A18 | 6.49952122E−17 | 1.07248437E−13 | −4.60632068E−12 |
| A19 | −3.93247558E−18 | −2.59848620E−15 | 2.10731427E−13 |
| A20 | 2.82311452E−21 | 1.14324796E−17 | 2.85766740E−14 |

| Sn | 20 | 23 | 24 |
|---|---|---|---|
| KA | 6.40578232E−01 | 1.01628889E+00 | 1.02166325E+00 |
| A3 | 0.00000000E+00 | 0.00000000E+00 | 0.00000000E+00 |
| A4 | 1.63126964E−03 | 1.69404176E−03 | 1.71954692E−03 |
| A5 | 5.00272556E−04 | 9.92804167E−04 | 4.78048827E−05 |
| A6 | −2.19593632E−04 | −4.81900268E−04 | 1.06326334E−04 |
| A7 | 1.68146572E−06 | 2.13778804E−05 | −4.02755832E−05 |
| A8 | 2.28584774E−05 | 5.50790405E−05 | −2.13249353E−05 |
| A9 | −6.02039291E−06 | −1.52329771E−05 | 1.16040200E−05 |
| A10 | −1.74260176E−06 | −2.31912652E−06 | 4.11600396E−07 |
| A11 | 7.36259753E−07 | 1.39996322E−06 | −1.14420462E−06 |
| A12 | 7.22294587E−08 | −7.54682221E−09 | 1.07456810E−07 |
| A13 | −4.19737968E−08 | −6.13715799E−08 | 5.61850760E−08 |
| A14 | −1.34916380E−09 | 4.03631136E−09 | −8.99347678E−09 |
| A15 | 1.26493150E−09 | 1.43925402E−09 | −1.48350867E−09 |
| A16 | 2.14937787E−12 | −1.42773952E−10 | 3.09111492E−10 |
| A17 | −1.95520674E−11 | −1.72173569E−11 | 2.00984507E−11 |
| A18 | 2.85673724E−13 | 2.14032043E−12 | −5.09049610E−12 |
| A19 | 1.22706849E−13 | 8.13185348E−14 | −1.09210877E−13 |
| A20 | −3.06109276E−15 | −1.24023377E−14 | 3.31189761E−14 |

Figure 16:
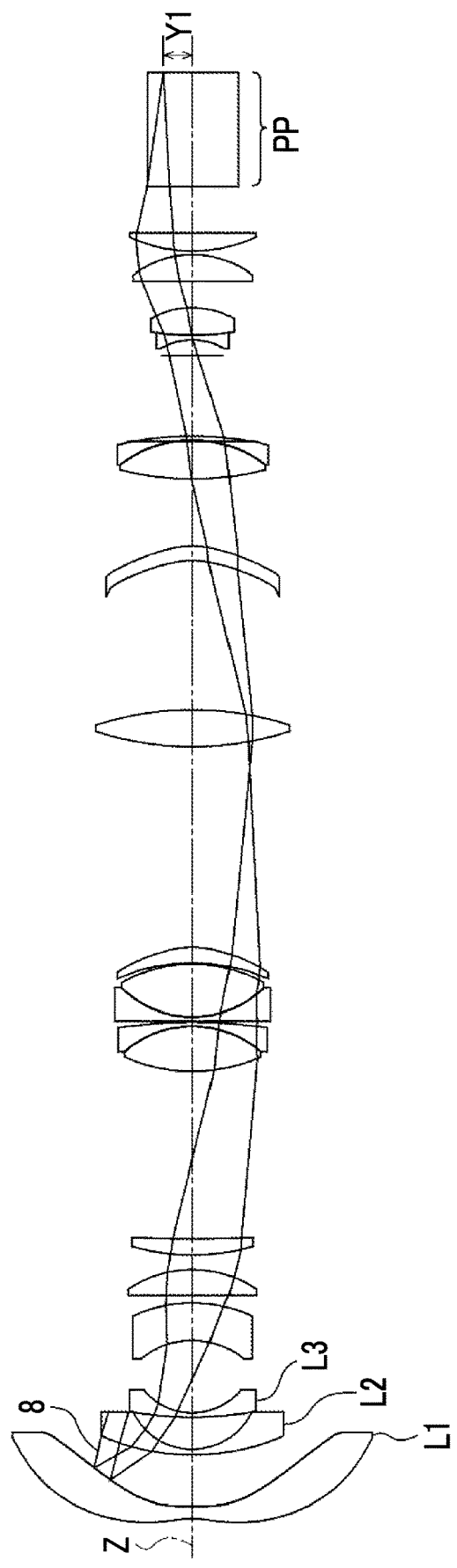
FIG. 16 is a diagram illustrating an optical path of light reflected by the reduction-side surface of the first lens.

FIG. 16 illustrates the result of ray tracing in a case in which light emitted from the position at the height Y1 from the optical axis Z on the image display surface is reflected by a reduction-side surface of the first lens L1 in the projection optical system 4 before the absorption layer 7 is provided. The light 8 reflected by the reduction-side surface of the first lens L1 reaches the flat chamfered surface which is the non-optically effective surface of the second lens L2.

Table 13 illustrates the corresponding values of Conditional Expressions (1) to (4) of the projection-type display devices according to Examples 1 to 3. In addition, Table 14 illustrates numerical values related to the conditional expressions and numerical values related to the preferable configuration. In Table 14, Ymax is equal to ΦIC/2. Tables 13 and 14 illustrate values rounded off to a predetermined digit on the basis of the d-line.

TABLE 13

| Expression number | | Example 1 | Example 2 | Example 3 |
|---|---|---|---|---|
| (1) | \|f\|/w | 0.344 | 0.364 | 0.286 |
| (2) | Rc(hlf)/Rc(hlf/2) | 0.474 | 0.499 | 0.579 |
| (3) | Db12/Denp | 0.504 | 0.529 | 0.890 |
| (4) | R2f/R2r | 2.077 | 1.930 | 3.474 |

TABLE 14

| | Example 1 | Example 2 | Example 3 |
|---|---|---|---|
| \|f\| | 1.00 | 1.00 | 1.00 |
| w | 2.903 | 2.745 | 3.497 |
| Rc(hlf) | 8.8289 | 11.7324 | 13.6366 |
| Rc(hlf/2) | 18.6098 | 23.5020 | 23.5562 |
| h1f | 7.676 | 9.998 | 11.839 |
| h1r | 6.214 | 8.266 | 9.473 |
| h2f | 5.515 | 6.345 | 6.059 |
| Ymax | 2.635 | 2.636 | 2.901 |
| Y1 | 2.339 | 2.023 | 1.856 |
| Db12 | 1.8424 | 2.4048 | 4.2774 |
| Denp | 3.6581 | 4.5469 | 4.8036 |
| R2f | 9.7069 | 10.9737 | 15.6205 |
| R2r | 4.6728 | 5.6865 | 4.4969 |
| SGL1 | 1.01 | 1.01 | 1.01 |

Figure 17:
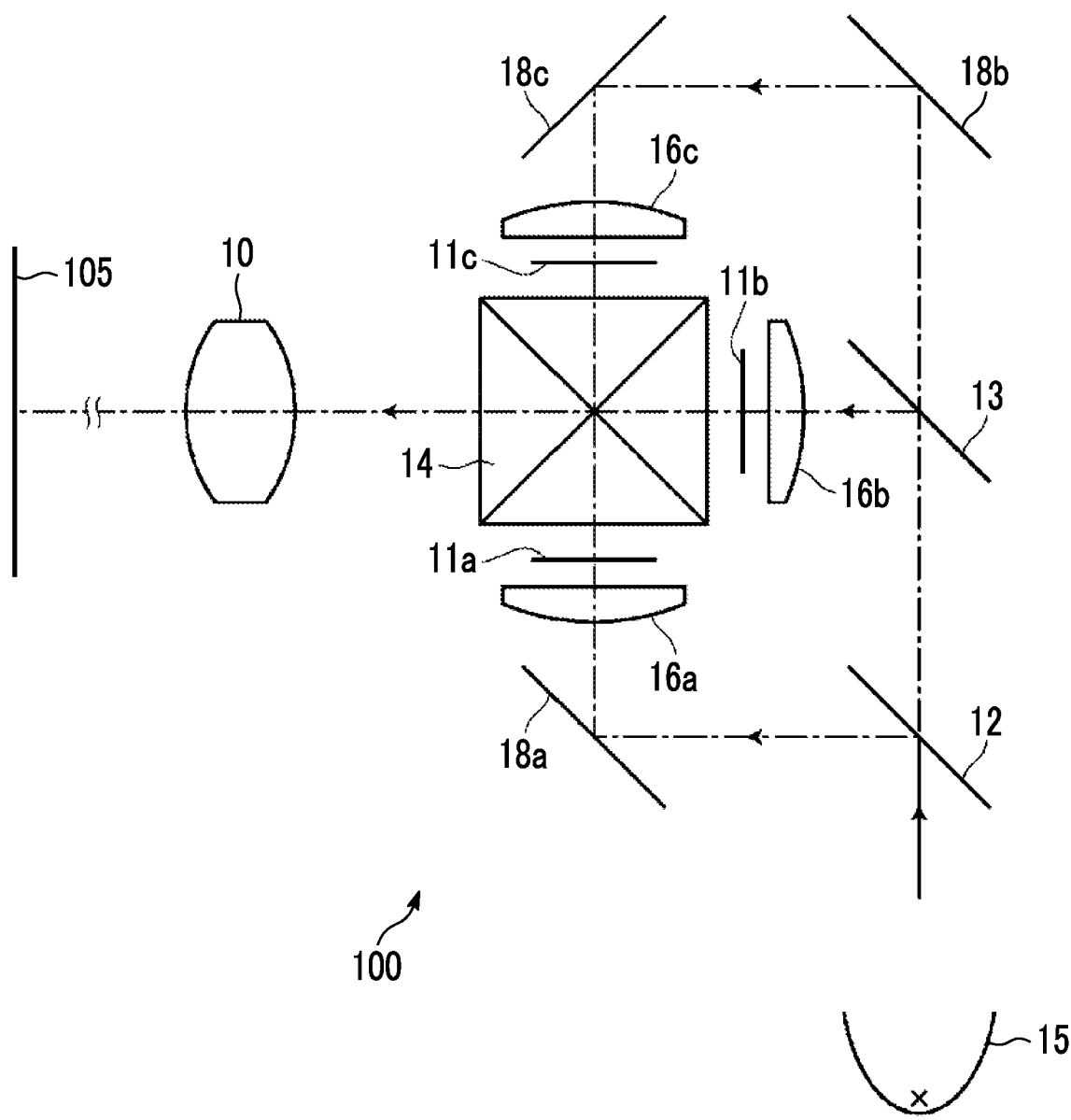
FIG. 17 is a schematic diagram illustrating a configuration of a projection-type display device according to a first modification example.

Next, a modification example of the projection-type display device will be described. FIG. 17 is a schematic diagram illustrating the configuration of a projection-type display device according to a first modification example. A projection-type display device 100 illustrated in FIG. 17 includes the projection optical system 10 according to the embodiment of the present disclosure, a light source 15, transmissive display elements 11a to 11c corresponding to light of each color, dichroic mirrors 12 and 13 for color separation, a cross dichroic prism 14 for color combination, condenser lenses 16a to 16c, and total reflection mirrors 18a to 18c for deflecting an optical path. The projection-type display device 100 is a so-called three-panel type in which the display element according to the technology of the present disclosure is composed of three transmissive display elements 11a to 11c corresponding to three color-separated light components. The transmissive display elements 11a to 11c are, for example, liquid crystal display elements. In addition, FIG. 17 schematically illustrates the projection optical system 10. Further, an integrator is disposed between the light source 15 and the dichroic mirror 12, which is not illustrated in FIG. 17.

White light emitted from the light source 15 is separated into luminous fluxes of three colors (green light, blue light, and red light) by the dichroic mirrors 12 and 13. Then, the color luminous fluxes pass through the condenser lenses 16a to 16c, are incident on the corresponding transmissive display elements 11a to 11c, and are modulated. The modulated color luminous fluxes are combined by the cross dichroic prism 14 and then incident on the projection optical system 10. The projection optical system 10 projects an optical image, which is formed by the light modulated by the transmissive display elements 11a to 11c, onto a screen 105.

Figure 18:
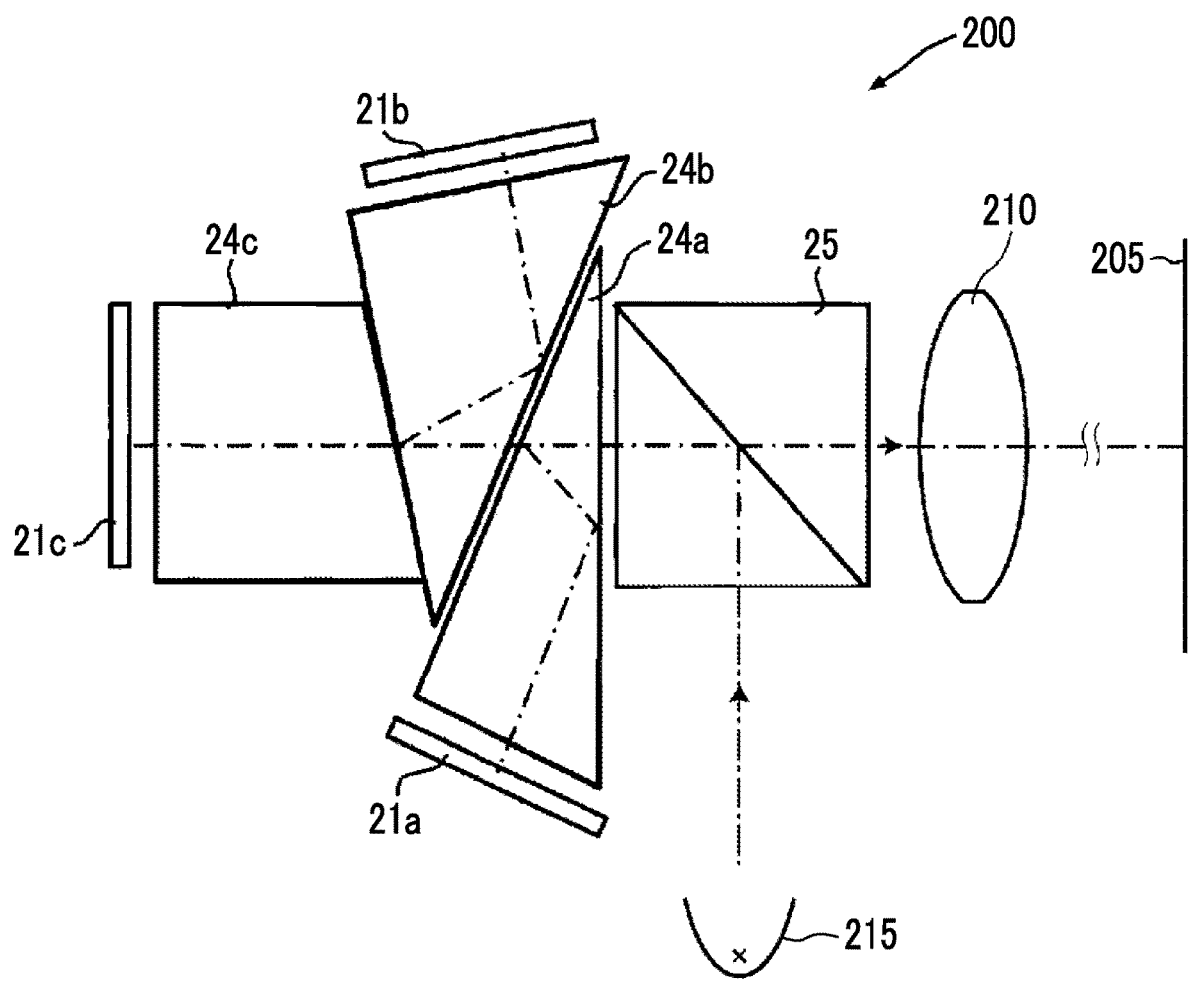
FIG. 18 is a schematic diagram illustrating a configuration of a projection-type display device according to a second modification example.

FIG. 18 is a schematic diagram illustrating the configuration of a projection-type display device according to a second modification example. A projection-type display device 200 illustrated in FIG. 18 includes a projection optical system 210 according to the embodiment of the present disclosure, a light source 215, DMDs 21a to 21c corresponding to light of each color, total internal reflection (TIR) prisms 24a to 24c for color separation and color combination, and a polarization prism 25 that separates illumination light and projection light. The projection-type display device 200 is also a three-panel type in which the display element according to the technology of the present disclosure is composed of three DMDs 21a to 21c corresponding to light of each color. In addition, FIG. 18 schematically illustrates the projection optical system 210. Further, an integrator is disposed between the light source 215 and the polarization prism 25, which is not illustrated in FIG. 18.

White light emitted from the light source 215 is reflected by a reflecting surface in the polarization prism 25 and is then separated into luminous fluxes of three colors (green light, blue light, and red light) by the TIR prisms 24a to 24c. The separated luminous fluxes of each color are incident on the corresponding DMDs 21a to 21c, are modulated by the DMDs 21a to 21c, travel through the TIR prisms 24a to 24c again in a reverse direction such that the colors are combined, pass through the polarization prism 25, and are incident on the projection optical system 210. The projection optical system 210 projects an optical image, which is formed by the light modulated by the DMDs 21a to 21c, onto a screen 205.

Figure 19:
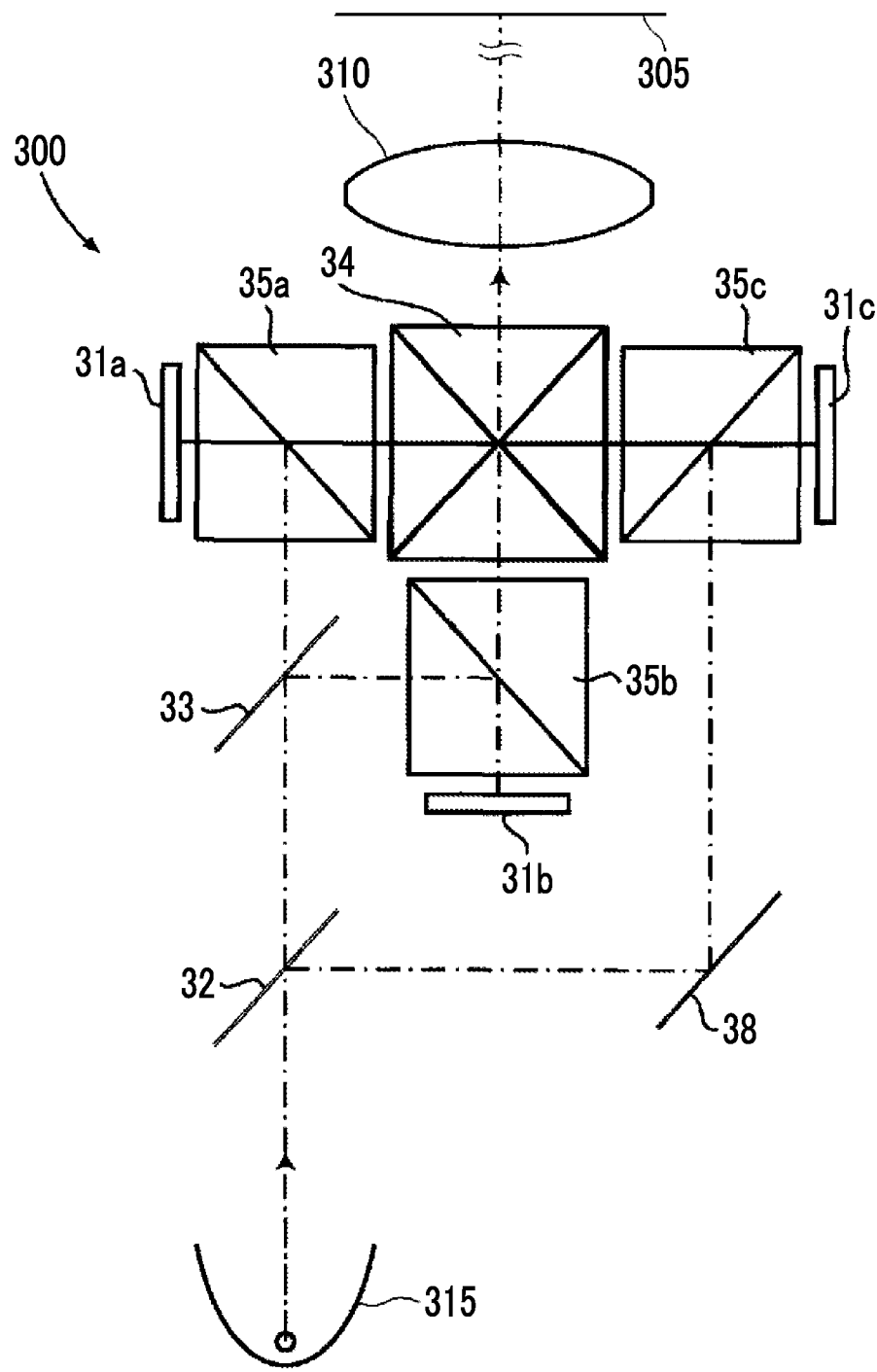
FIG. 19 is a schematic diagram illustrating a configuration of a projection-type display device according to a third modification example.

FIG. 19 is a schematic diagram illustrating the configuration of a projection-type display device according to a third modification example. A projection-type display device 300 illustrated in FIG. 19 includes a projection optical system 310 according to the embodiment of the present disclosure, a light source 315, reflective display elements 31a to 31c corresponding to light of each color, dichroic mirrors 32 and 33 for color separation, a cross dichroic prism 34 for color combination, a total reflection mirror 38 for deflecting an optical path, and polarization prisms 35a to 35c. The projection-type display device 300 is also a three-panel type in which the display element according to the technology of the present disclosure is composed of three reflective display elements 31a to 31c corresponding to light of each color. The reflective display elements 31a to 31c are, for example, reflective liquid crystal display elements in which liquid crystal cells corresponding to pixels are formed on a silicon substrate. In addition, FIG. 19 schematically illustrates the projection optical system 310. Further, an integrator is disposed between the light source 315 and the dichroic mirror 32, which is not illustrated in FIG. 19.

White light emitted from the light source 315 is separated into luminous fluxes of three colors (green light, blue light, and red light) by the dichroic mirrors 32 and 33. The separated luminous fluxes of each color pass through the polarization prisms 35a to 35c, are incident on the reflective display elements 31a to 31c corresponding to the luminous fluxes of each color, are modulated by the reflective display elements 31a to 31c, are subjected to color combination by the cross dichroic prism 34, and are incident on the projection optical system 310. The projection optical system 310 projects an optical image, which is formed by the light modulated by the reflective display elements 31a to 31c, onto a screen 305.

The technology of the present disclosure has been described above using the embodiment and the examples. However, the technology of the present disclosure is not limited to the above-described embodiment and examples and can be modified in various ways.

For example, the radius of curvature, surface spacing, refractive index, Abbe number, aspherical coefficients, and the like of each lens in the projection optical system are not limited to the values illustrated in each of the above-mentioned numerical examples and may have different values.

In addition, in the above-described embodiment, the projection optical system having a linear optical path is described. However, the technology of the present disclosure is not limited thereto. The projection optical system according to the technology of the present disclosure may have a configuration in which an optical path deflection member deflecting at least one optical path is disposed and a deflected optical path is provided.

Further, the members constituting the projection-type display device are not limited to the above-mentioned examples. For example, the optical member used to separate or combine the luminous flux and the display element can be changed in various aspects. The display element is not limited to the aspect in which it spatially modulates light from the light source and outputs the modulated light as an optical image based on image data. For example, the display element may output light, which is output from a self-luminous display element, as an optical image based on image data. An example of the self-luminous display element is a display element in which light emitting elements, such as light emitting diodes (LED) or organic light emitting diodes (OLED), are two-dimensionally arranged.

What is claimed is:

1. A projection-type display device comprising:
a display element including a rectangular displayable region in which an image is displayable; and
a projection optical system that includes a plurality of lenses and projects the image displayed by the display element to form a projection image,
wherein, assuming that an effective radius of an enlargement-side surface of a first lens which is closest to an enlargement side among the plurality of lenses included in the projection optical system is h1f; in a cross section that is parallel to an optical axis and includes the optical axis, a distance from an intersection of the optical axis and a normal line to the enlargement-side surface of the first lens at a point at a height h from the optical axis on the enlargement-side surface to the point at the height h is a local radius of curvature at the height h and is represented by Rc(h); and a sign of the local radius of curvature is positive in a case in which the intersection is closer to a reduction side than the point at the height h and is negative in a case in which the intersection is closer to an enlargement side than the point at the height h, Rc(h1f)>0 and Rc(h1f/2)>0 are satisfied,
assuming that a focal length of the projection optical system is f and a length of a long side of the displayable region is w, the following Conditional Expressions (1) and (2) are satisfied:

$$0.15 < |f|/w < 0.45 \quad (1); \text{ and}$$

$$0 < Rc(h1f)/Rc(h1f/2) < 0.8 \quad (2) \text{ and}$$

an absorption layer that absorbs light is provided in at least a portion of a non-optically effective surface of a lens which is disposed closer to the reduction side than the first lens and at least a part of a portion which is irradiated with light that has been emitted from the image and reflected by the enlargement-side surface of the first lens or a reduction-side surface of the first lens.

2. The projection-type display device according to claim 1,
wherein the absorption layer is provided on the non-optically effective surface of a second lens that is second from the enlargement side among the plurality of lenses included in the projection optical system.

3. The projection-type display device according to claim 2,
wherein, assuming that a distance from the enlargement-side surface of the first lens to an enlargement-side surface of the second lens on the optical axis is Db12, a distance from the enlargement-side surface of the first lens to a paraxial entrance pupil position of the projection optical system on the optical axis in a case in which the enlargement side is an incident side is Denp, a sign of Db12 is positive, and a sign of Denp is positive in a case in which the paraxial entrance pupil position is closer to the reduction side than the enlargement-side surface of the first lens and is negative in a case in which the paraxial entrance pupil position is closer to the enlargement side than the enlargement-side surface of the first lens on the optical axis, the following Conditional Expression (3) is satisfied:

$$0.2 < Db12/Denp < 1 \qquad (3).$$

4. The projection-type display device according to claim 2,
wherein, assuming that the effective radius of the enlargement-side surface of the second lens is h2f, the effective radius of the reduction-side surface of the first lens is h1r, a reduction-side maximum image height of the projection optical system is Ymax, and Y1=Ymax×h2f/h1r is established, the absorption layer is provided in at least a portion of the non-optically effective surface of the second lens and at least a part of a portion which is irradiated with light that has been emitted from a position at a height Y1 from the optical axis on the image and reflected by the enlargement-side surface of the first lens or the reduction-side surface of the first lens.

5. The projection-type display device according to claim 2,
wherein the second lens is a meniscus lens that has a convex surface facing the enlargement side and has a negative refractive power.

6. The projection-type display device according to claim 5,
wherein, assuming that a paraxial radius of curvature of the enlargement-side surface of the second lens is R2f and a paraxial radius of curvature of a reduction-side surface of the second lens is R2r, the following Conditional Expression (4) is satisfied:

$$1.2 < R2f/R2r < 10 \qquad (4).$$

7. The projection-type display device according to claim 1,
wherein the enlargement-side surface of the first lens has a shape in which an inflection point is within the effective radius in a cross section that is parallel to the optical axis and includes the optical axis.

8. The projection-type display device according to claim 7,
wherein the enlargement-side surface of the first lens has a concave shape in a paraxial region.

9. The projection-type display device according to claim 1,
wherein a material forming the first lens has a specific gravity of 1.5 or less.

10. The projection-type display device according to claim 1,
wherein light for projecting the projection image has a brightness of 5000 ANSI lumens or more.

11. The projection-type display device according to claim 1,
wherein the following Conditional Expression (1-1) is satisfied:

$$0.2 < |f|/w < 0.4 \qquad (1\text{-}1).$$

12. The projection-type display device according to claim 1,
wherein the following Conditional Expression (2-1) is satisfied:

$$0.2 < Rc(h1f)/Rc(h1f/2) < 0.7 \qquad (2\text{-}1).$$

13. The projection-type display device according to claim 6,
wherein the following Conditional Expression (4-1) is satisfied:

$$1.5 < R2f/R2r < 5 \qquad (4\text{-}1).$$

14. The projection-type display device according to claim 3,
wherein, assuming that the effective radius of the enlargement-side surface of the second lens is h2f, the effective radius of the reduction-side surface of the first lens is h1r, a reduction-side maximum image height of the projection optical system is Ymax, and Y1=Ymax×h2f/h1r is established, the absorption layer is provided in at least a portion of the non-optically effective surface of the second lens and at least a part of a portion which is irradiated with light that has been emitted from a position at a height Y1 from the optical axis on the image and reflected by the enlargement-side surface of the first lens or the reduction-side surface of the first lens.

15. The projection-type display device according to claim 3,
wherein the second lens is a meniscus lens that has a convex surface facing the enlargement side and has a negative refractive power.

16. The projection-type display device according to claim 4,
wherein the second lens is a meniscus lens that has a convex surface facing the enlargement side and has a negative refractive power.

17. The projection-type display device according to claim 15,
wherein, assuming that a paraxial radius of curvature of the enlargement-side surface of the second lens is R2f and a paraxial radius of curvature of a reduction-side surface of the second lens is R2r, the following Conditional Expression (4) is satisfied:

$$1.2 < R2f/R2r < 10 \qquad (4).$$

18. The projection-type display device according to claim 16,
wherein, assuming that a paraxial radius of curvature of the enlargement-side surface of the second lens is R2f and a paraxial radius of curvature of a reduction-side surface of the second lens is R2r, the following Conditional Expression (4) is satisfied:

$$1.2 < R2f/R2r < 10 \qquad (4).$$

* * * * *